Figure 3:
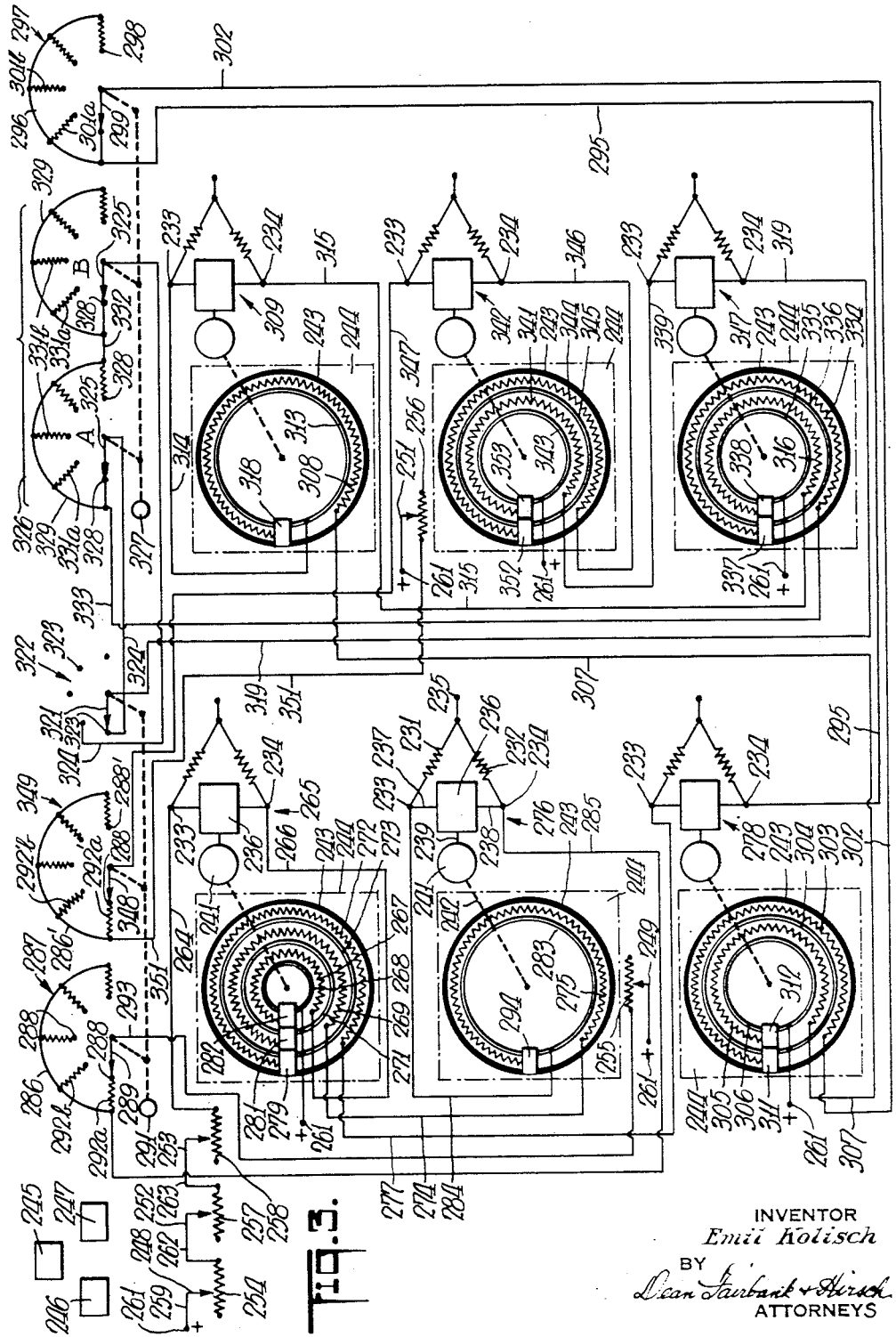

Aug. 17, 1954 — E. KOLISCH — 2,686,634
EQUIPMENT FOR PROMOTING ECONOMICAL
AND SAFE LOADING OF AIRCRAFT
Filed Feb. 26, 1952 — 5 Sheets-Sheet 1
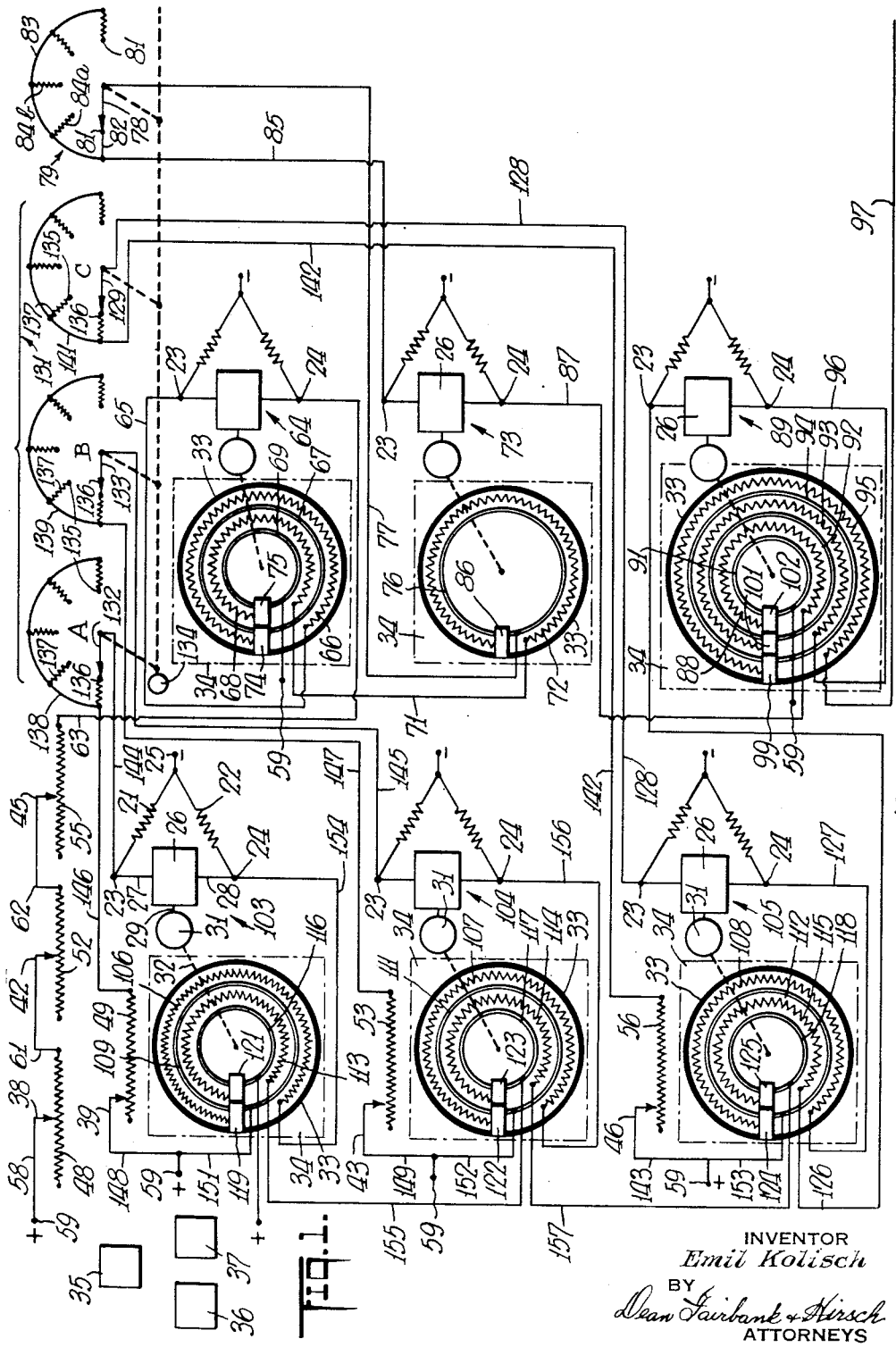
INVENTOR
*Emil Kolisch*
BY
*Dean Fairbank & Hirsch*
ATTORNEYS Aug. 17, 1954

E. KOLISCH 2,686,634

EQUIPMENT FOR PROMOTING ECONOMICAL
AND SAFE LOADING OF AIRCRAFT

Filed Feb. 26, 1952

5 Sheets-Sheet 2

INVENTOR
*Emil Kolisch*
BY
*Dean Fairbank & Hirsch*
ATTORNEYS

Aug. 17, 1954  E. KOLISCH  2,686,634
EQUIPMENT FOR PROMOTING ECONOMICAL
AND SAFE LOADING OF AIRCRAFT
Filed Feb. 26, 1952  5 Sheets-Sheet 3

INVENTOR
Emil Kolisch
BY
Dean Fairbank + Hirsch
ATTORNEYS

Aug. 17, 1954 E. KOLISCH 2,686,634
EQUIPMENT FOR PROMOTING ECONOMICAL
AND SAFE LOADING OF AIRCRAFT
Filed Feb. 26, 1952 5 Sheets-Sheet 4

INVENTOR
*Emil Kolisch*
BY
*Dean Fairbank & Hirsch*
ATTORNEYS

Aug. 17, 1954

E. KOLISCH 2,686,634

EQUIPMENT FOR PROMOTING ECONOMICAL
AND SAFE LOADING OF AIRCRAFT

Filed Feb. 26, 1952

5 Sheets-Sheet 5

INVENTOR
Emil Kolisch
BY
Dean Fairbank & Hirsch
ATTORNEYS

Patented Aug. 17, 1954

2,686,634

UNITED STATES PATENT OFFICE 2,686,634

EQUIPMENT FOR PROMOTING ECONOMICAL AND SAFE LOADING OF AIRCRAFT

Emil Kolisch, New York, N. Y., assignor to Continental Silver Co. Inc., Brooklyn, N. Y., a corporation of New York Application February 26, 1952, Serial No. 273,493

15 Claims. (Cl. 235—61)

As conducive to an understanding of the invention, it is noted that in order for an aircraft to take off, fly and land safely, its center of gravity along the length of the plane must be at some predetermined location which may vary between certain definite fixed limits.

These permissible fixed limits are determined by the manufacturer of the aircraft, ordinarily by flight tests, and are generally expressed with respect to the mean aerodynamic chord, hereinafter designated "MAC." The MAC of an aircraft is described in text books as the chord of an air-foil, which is generally a definite segment between the leading and trailing edges of the wing.

The distance of the center of gravity of an aircraft from a fixed reference datum is equal to the total moment of such aircraft about such reference datum divided by its total weight. Where the nose of the aircraft is selected as the reference datum, and the aircraft is of the type having a nose wheel and a pair of main wheels, the distance of each wheel from the nose along the length or longitudinal axis of the aircraft is multiplied by the weight on the corresponding wheel to determine the respective moments about the nose. The sum of these moments is divided by the sum of the three weights to determine the distance of the center of gravity from the nose.

Such calculations may be expressed by the formula:

(1)
$$CG = \frac{(WNW \times DNW) + (WLMW \times DLMW) + (WRMW \times DRMW)}{WNW + WLMW + WRMW}$$

in which $CG$ = distance of center of gravity from nose of aircraft.

(1)

$WNW$ = weight on nose wheel.
$DNW$ = the distance from the nose of the center of the nose wheel when projected upon the longitudinal axis of the aircraft.
$WLMW$ = weight on left main wheel.
$DLMW$ = the distance from the nose of the center of the left main wheel when projected upon the longitudinal axis of the aircraft.
$WRMW$ = weight on right main wheel.

$DRMW$ = the distance from the nose of the center of the right main wheel when projected upon the longitudinal axis of the aircraft.

The center of gravity may be determined more simply by using the main wheels as the reference datum. The quotient of the product of weight on the nose wheel by its distance from the main wheels divided by the total weight of the plane gives the projection upon the longitudinal axis of the aircraft of the distance of the center of gravity from the center of the main wheels.

Such calculations may be expressed by the formula:

(2)
$$CG = \frac{WNW \times DNW}{WNW + WLMW + WRMW}$$

in which $CG$ = distance of center of gravity from main wheels.
$WNW$ = weight on nose wheel.
$DNW$ = distance of the nose wheel from the center of the main wheels when projected upon the longitudinal axis of the aircraft.
$WLMW$ = weight on left main wheel.
$WRMW$ = weight on right main wheel.

To illustrate the two formulas above-mentioned, let it be assumed that the nose wheel of an aircraft is 100 inches from its nose and carries a weight of 10,000 pounds and the two main wheels are 430 inches from the nose and each carries a weight of 30,000 pounds.

In the first formula we find:

(1)
$$CG = \frac{(10,000 \times 100) + (30,000 \times 430) + (30,000 \times 430)}{10,000 + 30,000 + 30,000} = 382.86$$

In the second formula for CG, we find:

(2)
$$CG = \frac{(10,000 \times 330)}{10,000 + 30,000 + 30,000} = 47.14$$

As the center of gravity determined by the first formula utilized the nose of the aircraft as the reference datum, the value determined, i. e., 382.86 inches, is the distance of the center of gravity from the nose. In the second formula the main wheels were used as the reference datum and the value of 47.14 inches in the direction of the nose wheel is the distance of the center of gravity from the main wheels. As the distance from the nose of the aircraft to the main wheels is equal to 430 inches, it is apparent that regardless of which formula is used, the center of gravity will be at the same location, i. e., 382.86 inches from the nose of the aircraft.

Assuming that the aircraft, after the center of gravity has been determined, as above described, is loaded with an additional weight of 1,000 pounds at a point 200 inches from its nose, the new center of gravity as thus loaded may be determined by the following formula:

$$(3) \quad CG_1 = \frac{(CG \times \text{weight}) + (\text{added weight} \times arm)}{\text{Weight} + \text{added weight}}$$

If the nose of the aircraft is utilized as the reference datum:

$CG_1$=distance of new center of gravity from nose of aircraft.
$arm$=distance of added weight from nose of aircraft.

If the main wheels are used as the reference datum:

$CG_1$=distance of new center of gravity from main wheels.
$arm$=distance of added weight from main wheels.
Weight in both cases=the weight of the aircraft before the added weight is loaded.

Utilizing formula 3 for each reference datum:

$$CG_1 = \frac{(382.86 \times 70,000) + (1,000 \times 200)}{70,000 + 1,000} = 380.28 \text{ inches from nose}$$

$$CG_1 = \frac{(47.14 \times 70,000) + (1,000 \times 230)}{71,000} = 49.72 \text{ inches from main wheels}$$

The center of gravity of an aircraft with respect to any given reference datum may also be expressed in terms of percent MAC which is the ratio of the distance of the center of gravity from the leading edge of the MAC to the width of the MAC multiplied by 100.

The percent MAC may be determined by using the formula:

$$(4) \quad CG \text{ in percent } MAC = \frac{H-Y}{C} \times 100$$

in which H=distance from reference datum to center of gravity.
Y=distance from reference datum to leading edge of MAC.
C=width of MAC.

Assume for example, that the aircraft has its nose wheel 100 inches from the nose and its main wheels 430 inches from the nose, and has an MAC 164 inches in width with its leading edge 355 inches from the nose, and the permissible limits of the MAC are between 380 and 400 inches from the nose.

Utilizing the nose of the aircraft as the reference datum, and selecting as the center of gravity the forward limit of the MAC $$CG = \frac{380 - 355}{164} \times 100 = 15.2\% \; MAC$$

and selecting as the center of gravity the rearward limit of the MAC $$CG = \frac{400 - 355}{164} \times 100 = 27.4\% \; MAC$$

Utilizing as the reference datum, the main wheels which are 430 inches from the nose of the aircraft, the permissible limits of the MAC will be between 30 and 50 inches from the main wheels; the minus sign allowing for the fact that the measurements of H and Y are in the negative or forward direction:

$$CG = -\frac{50 - 75}{164} \times 100 = 15.2\% \; MAC$$

$$CG = -\frac{30 - 75}{164} \times 100 = 27.4\% \; MAC$$

According to one present practice, the basic weight of an aircraft, i. e., without fuel, crew, safety equipment or cargo, but including all standard equipment, is determined generally by actually weighing the aircraft on suitable scales. The basic center of gravity is then calculated by utilizing suitable formulas such as Formulas 1 or 2 above described.

Assuming that the aircraft is to travel to a predetermined destination requiring a given fuel load, the weight of which is readily ascertainable, a specialist in the Weights and Balances Division of an airport, taking into consideration the basic weight and basic center of gravity of the aircraft as well as the weight of the crew, fuel and safety equipment and the location of such items, may determine a standard calculating device, such as a slide rule which is well known to those skilled in the art, the initial center of gravity of the aircraft.

The payload or weight of cargo is of course the permissible gross take off weight less the basic weight of the aircraft, fuel, crew and safety equipment.

According to the present practice, the cargo loading supervisor attempts to distribute the cargo, including passengers, along the length of the aircraft so that the final center of gravity of the fully loaded aircraft will fall within the permissible limits of its MAC.

Generally the heaviest cargo is loaded into a compartment which is adjacent to or between the permissible limits of the MAC. The weight of the successive items of cargo, generally indicated on each item by the shipper or manufacturer, and their position in the aircraft are noted on the manifest as the loading proceeds.

After the aircraft has been loaded, the manifest is turned over to the Weights and Balances Division of the airport, which transfers the data on the manifest to a slide rule which indicates the final or take off center of gravity of the aircraft as thus loaded.

Should the final center of gravity thus shown on the slide rule be outside of the permissible limits of the MAC, the cargo loading supervisor will be advised that the cargo is improperly loaded and must be shifted. Thus, if the plane is tail-heavy, cargo must be shifted forward and if the plane is nose-heavy, cargo must be shifted toward the rear of the plane. It is apparent that such procedure is time-consuming and costly but must be followed, for it would be unsafe to attempt to fly the aircraft unless it was properly loaded.

Inasmuch as it is essential that the final center of gravity of the loaded aircraft be within the permissible limits of the MAC for safe take off, flying and landing of the aircraft, the personnel of the Weights and Balances Division must be highly trained and must perform their work with extreme care, for any errors in their calculations might have fatal consequences. As a result, the calculations of the Weights and Balances Division must be carefully checked and re-checked for errors and even with such checking, by reason of the human element involved, there is no assurance that some error has not remained undetected.

Inasmuch as the subsequent settings of the slide rule to determine the final center of gravity of the loaded aircraft depends upon the accuracy of the basic center of gravity determination thereof, if any items of equipment should be added to or removed from the aircraft without appropriate entries and calculations being made of the weight added or removed and the location of such weight, no matter how accurately the subsequent settings on the slide rule are made for the initial center of gravity determination with respect to crew members, fuel and safety equipment and the final center of gravity determination with respect to cargo, such slide rule determined final center of gravity may differ materially from the actual final center of gravity of the aircraft.

Even if all items added to or removed from the aircraft are properly listed and calculated, due to extraneous factors present at the time of take off, the slide rule determined final center of gravity of the aircraft may in fact not be its actual final center of gravity. Thus, for example, if the aircraft has been carrying cargo such as coal, the collection of coal dust in the crevices of the aircraft, especially near the tail end, may add such a moment that the final center of gravity determined by the slide rule, though within the permissible limits of the MAC, is misleading because the actual center of gravity may in fact be outside of such limits. As a result, the aircraft may be tail-heavy, with resultant possibility of crash on take off. In addition, such factors as collection of moisture on the surfaces of the aircraft before take off may add a moment that also will cause the actual final center of gravity at time of take off to differ from the slide rule determined center of gravity with resultant possibility of crash or uneconomical fuel consumption during flight.

In addition to the reasons above given for the deviation of the slide rule determined final center of gravity from the actual final center of gravity, it is very possible that the weights of the items of cargo used in the calculations, if taken from the suppliers' markings on such items, may be inaccurate and such inaccuracy might also cause the actual final center of gravity of the aircraft to differ from the slide rule determined final center of gravity with resultant possible fatal consequences.

Moreover, as fuel is consumed by the aircraft in flight, the center of gravity of such aircraft may shift and may not be within the limits for safe landing.

It is accordingly among the objects of the invention to provide a method and equipment which may readily be operated by even an unskilled person and which will automatically take into account the actual weight of the loaded aircraft and the actual position of the contents thereof without error due to erroneous marking of weights on the items of cargo loaded into the aircraft, erroneous entries on the manifest of weight or position, omissions in entry or elimination of items of equipment added or withdrawn respectively from the aircraft or the accumulation of dust, dirt or moisture, and will quickly and accurately indicate the actual final center of gravity of the aircraft, in order to facilitate checking that it is within the permissible limits set by the manufacturer for safe take off, flying and landing, all without need for time-consuming calculations or manipulations of any sort and the possibility of human errors is completely eliminated.

Another object is to provide a method and equipment by which the actual position of center of gravity may be observed at all times as the loading proceeds, so as to dispense with the need for extensive shifting of the cargo in a fully loaded plane which may become necessary to assure safety when such guidance is not afforded.

Another object is to provide a method and equipment of the above type whereby, once the actual final center of gravity has been determined, the center of gravity of such aircraft at time of landing may be automatically ascertained with but a single simple manipulation based on the weight reduction during flight to a given destination.

It has been found that during weighing of an aircraft in the open, even on a relatively calm day, the force of the wind directed longitudinally whether from front to rear or rear to front of the aircraft, causes the weight indication on the scales to deviate from the actual weight of the aircraft. Where, however, the wind is directed laterally of the aircraft, its effect upon the weight indication is negligible.

It is accordingly another object of the invention to provide a method and equipment of the above type which will permit ready determination of the weight data with the aircraft positioned transversely of the direction of the wind and yet without the need for shifting or adjusting the weighing equipment or accessories thereof regardless what the direction of the wind.

According to the invention from its broader aspect, the equipment comprises facilities whereby the weight factor is introduced in response to the weight on the respective wheels to regulate an electric impulse related thereto. The equipment also comprises facilities to regulate an electric impulse related to the total moment of such aircraft with respect to any given reference datum. The electric impulses are connected in suitable circuits so as to give an indication equal to the total moment divided by the total weight or the distance of the center of gravity from the reference datum.

In a preferred application of the invention, a pair of current regulating means is actuated by each of the three wheels conventionally used on aircraft, the current regulating means of each pair being related respectively to the weight on the associated wheel and the distance of such wheel from any selected reference datum. The three pairs of current regulating means are connected in suitable circuits to give a response corresponding to the sum of the products of the weight on each wheel multiplied by its distance from the selected reference datum or the total moment of the aircraft with respect thereto.

Facilities are provided to set into circuit with such three pairs of current regulating means, additional current regulating means related to the sum of the weights on such three wheels. The current regulating means are connected in suitable circuits so as to give an indication equal to the total moment divided by the total weight or the distance of the center of gravity of the aircraft from the selected reference datum.

To this end, in a specific application of the invention, the current through resistance of value proportional to the logarithm of the total moment of the aircraft with respect to a given reference datum is opposed by current from a common source through resistance of value proportional to the logarithm of the total weight of the aircraft. The quotient of the total moment divided by the total weight is obtained from a variable logarithmic resistance in series with the total weight resistance and said variable resistance is operated preferably by a motor drive controlled by the resultant difference of potential until such difference is eliminated, whereby a suitable scale associated with said variable resistance will indicate the quotient of moment divided by weight or the distance of the center of gravity from the reference datum.

The total moment resistance desirably forms one leg of a Wheatstone bridge and the series connected total weight resistance and variable resistance form another leg, the motor drive being controlled by the output of the bridge until the latter is balanced.

Figure 4:
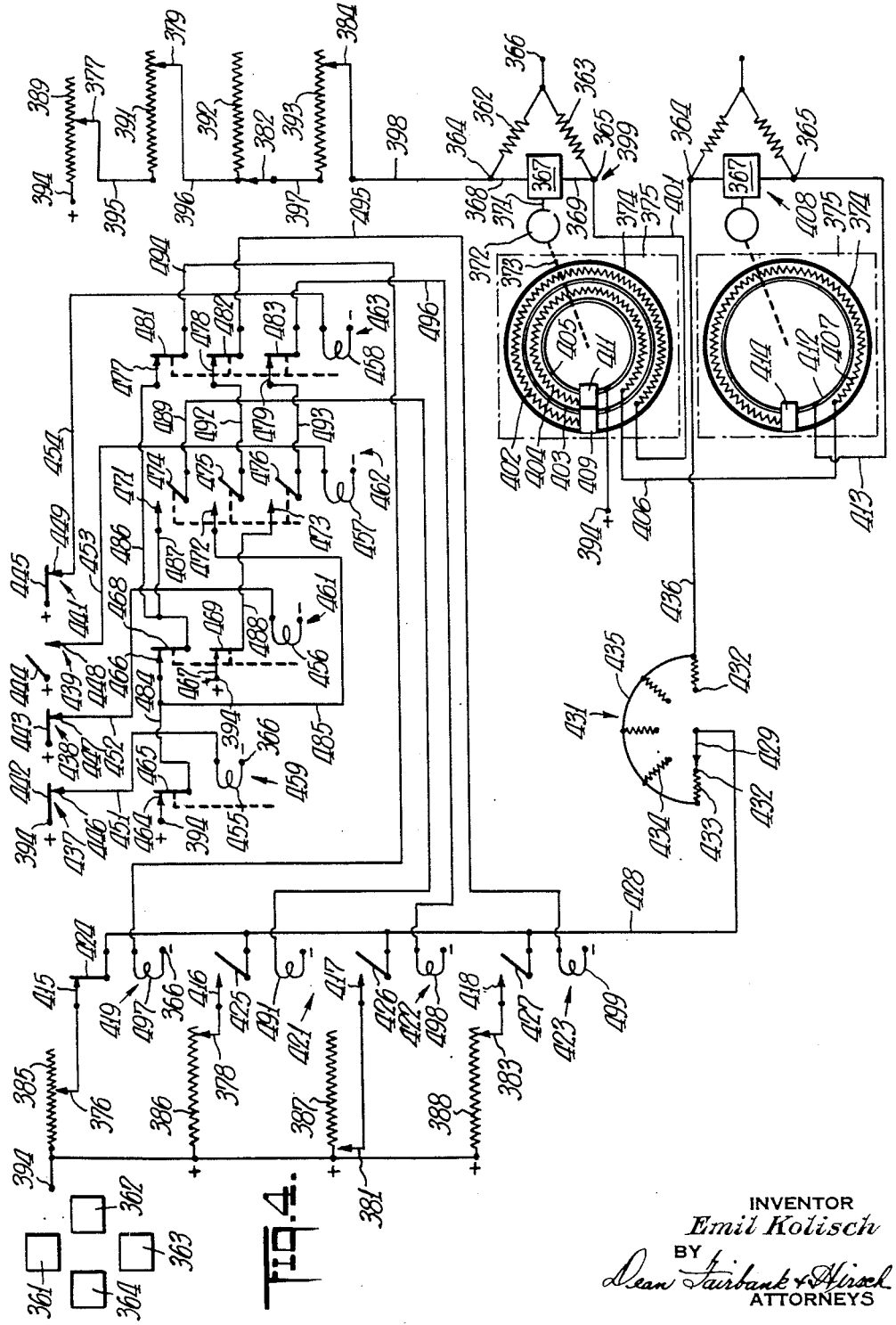
Figure 5:
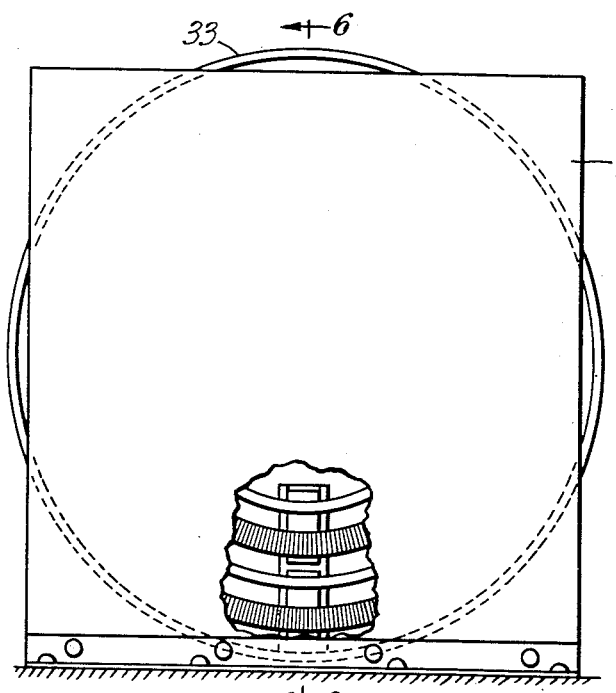
Figure 6:
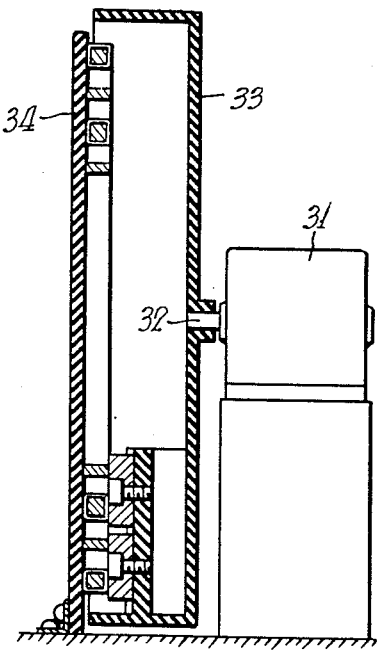
Figure 7:
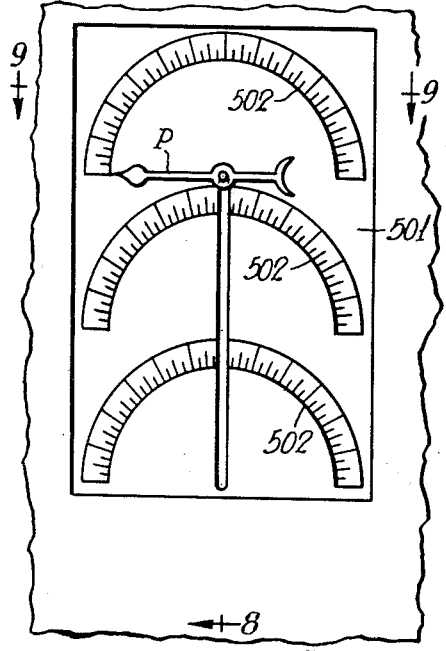
Figure 8:
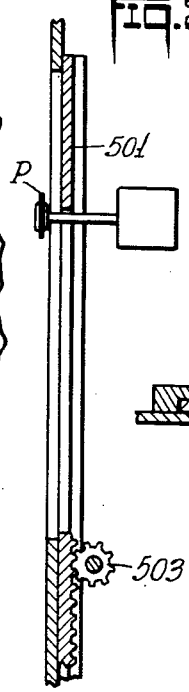
Figure 9:
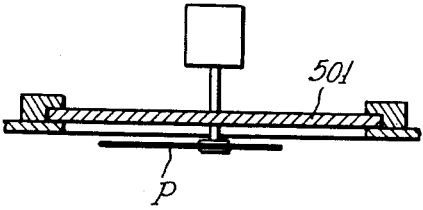

In the accompanying drawings in which are shown one or more of various possible embodiments of the several features of the invention, Figs. 1 and 2 are circuit diagrams of one embodiment of the equipment, Fig. 3 is a circuit diagram of another embodiment thereof, Fig. 4 is a circuit diagram similar to Fig. 3 with a wind compensator circuit added thereto, Fig. 5 is a front elevational view with parts broken away of a typical supporting panel, Fig. 6 is a longitudinal sectional view taken along line 6—6 of Fig. 5 of a typical indicating drum and drive motor, Fig. 7 is a diagrammatic front elevational view of an indicating scale, Fig. 8 is a longitudinal sectional view taken along line 8—8 of Fig. 7, and Fig. 9 is a transverse sectional view taken along line 9—9 of Fig. 7.

In order to simplify the description of the circuit and operation of the equipment, it will be assumed that the equipment is designed to measure the center of gravity of two types of aircraft, type A and type B, each illustratively having two main wheels and a third wheel which may be a nose wheel, it of course being understood that the equipment and circuit could readily be modified to measure any number of types of aircraft.

In the equipment shown in Figs. 1 and 2 of the drawings, three moments are utilized to determine the center of gravity, i. e., the moment of the weight on each wheel with respect to a reference datum, illustratively the nose of the aircraft.

The equipment utilizes a plurality of substantially identical Wheatstone bridge circuits. Each bridge circuit has a pair of balancing resistances 21 and 22 connected at one end to corresponding points 23 and 24 with the other ends of said resistances connected to corresponding negative main 25. A servo-amplifier 26 connected by input leads 27 and 28 respectively, to points 23 and 24 of each bridge is connected by lead 29 to a servo-motor 31. The servo-motor and servo-amplifier are illustratively of the type put out by the Brown Instrument Division of the Minneapolis-Honeywell Regulator Company under the designation Brown Electronik "continuous balance" unit No. 354,574. As shown in Figs. 1, 2, 5 and 6, the servo-motor 31 is operatively connected by means of a shaft 32 to a rotatable member, desirably a drum 33 which carries wiper means thereon to contact resistances and conducting rings on an associated insulating panel 34 so that depending upon the position of the drum and the wiper arm, a predetermined amount of resistance may be placed in circuit.

The equipment desirably comprises a plurality of weighing scales of any suitable type, three weighing scales being illustratively provided, designated by the numerals 35, 36 and 37, to measure the weight on the nose wheel and two main wheels respectively.

In the illustrative embodiment herein shown, each scale controls a set of three movable contact arms 38, 39, 41; 42, 43, 44 and 45, 46, 47, respectively which coact with an associated resistance bank 48, 49, 51; 52, 53, 54 and 55, 56, 57 respectively to place in circuit that portion of the associated resistance bank related to the value of the weight being measured.

The movable arm 38 of one of the scales, i. e., scale 35, is connected by lead 58 to positive main 59. One end of resistance bank 48 is connected by lead 61 to movable arm 42 of scale 36 and one end of resistance bank 52 is connected by lead 62 to movable arm 45 of scale 37. Thus, the resistances 48, 52 and 55 are connected in series.

One end of resistance bank 55 is connected by lead 63 to point 24 of Wheatstone bridge 64. Point 23 of bridge 64 is connected by lead 65 to one end of resistance bank 66, desirably a continuous length of wire mounted on insulating supporting panel 34 associated with bridge 64, said resistance desirably being arranged as an annulus. Also mounted on panel 34 concentric with resistance bank 66 and desirably encompassed thereby is a conducting ring 67, a second annular resistance bank 68 and a second conducting ring 69. The conducting rings 67 and 69 are both desirably connected to positive main 59 and one end of resistance bank 68 is connected by lead 71 to one end of an annular resistance bank 72 desirably mounted on an insulating panel 34 associated with Wheatstone bridge 73.

The drum 33 associated with Wheatstone bridge 64 mounts a pair of spaced wiper arms 74 and 75 insulated from each other and designed to contact resistance bank 66 and conducting ring 67; and resistance bank 68 and conducting ring 69, respectively. Thus, depending upon the position of the drum 33 and the wiper arms 74 and 75, a predetermined amount of resistance banks 66 and 68 will be placed in circuit.

Also mounted on panel 34 of bridge 73, concentric with resistance 72 is a conducting ring 76 connected by lead 77 to movable arm 78 of multiplier switch 79. Switch 79 has a plurality of fixed contacts 81 which may be selectively engaged by said movable arm 78. One of the fixed contacts 81 is connected by lead 82 to common lead 83 and each of the other fixed contacts 81 has a resistance connected thereto at one end and designated 84a, 84b. etc. The other end of said resistances 84 is connected to common lead 83 which is in turn connected by lead 85 to point 23 of Wheatstone bridge 73. The drum 33 of said bridge 73 carries a wiper arm 86 which is designed to contact resistance bank 72 and conducting ring 76 so that depending upon the position of drum 33 a predetermined amount of resistance bank 72 will be placed in circuit.

Point 24 of bridge 73 is connected by lead 87 to one end of annular resistance bank 88 mounted on panel 34 associated with bridge 89. Also mounted on panel 34 concentric with resistance bank 88 is a conducting ring 91, a second annular resistance bank 93 and associated conducting ring 92 and a third annular resistance bank 95 and associated conducting ring 94. The conducting rings 91, 92 and 94 are desirably connected to positive main 59. One end of annular resistance bank 93 is connected by lead 96 to point 24 of Wheatstone bridge 89. One end of annular resistance bank 95 is connected by lead 97 to point 24 of Wheatstone bridge 98.

The drum 33 associated with bridge 89 desirably mounts three longitudinally spaced wiper arms 99, 101 and 102 insulated from each other and designed respectively to contact annular resistance bank 95 and conducting ring 94; annular resistance bank 93 and conducting ring 92 and annular resistance bank 88 and conducting ring 91. Thus depending upon the position of drum 33, a predetermined amount of resistance banks 95, 93 and 88 will be placed in circuit.

The circuit also includes three Wheatstone bridges 103, 104 and 105 each of which has an associated panel 34. Each panel 34 mounts respectively an annular resistance bank 106, 107 and 108 concentric with conducting rings 109, 111 and 112 respectively, a second annular resistance bank 113, 114 and 115 and a second conducting ring 116, 117 and 118 respectively. The drum 33 associated with each of said Wheatstone bridges 103, 104 and 105 mounts a pair of spaced wiper arms 119, 121; 122, 123 and 124, 125 respectively. Each of the wiper arms contacts both a resistance bank and a conducting ring. Arms 119 and 121 contact resistance bank 106 and conducting ring 109; resistance bank 113 and conducting ring 116 respectively. Arms 122 and 123 contact resistance bank 107 and conducting ring 111; resistance bank 114 and conducting ring 117 respectively. Arms 124 and 125 contact resistance bank 108 and conducting ring 112; resistance bank 115 and conducting ring 118 respectively. Thus, depending upon the position of the drum associated with said bridges 103, 104 and 105, the wiper arms carried thereby will place a predetermined amount of the associated resistance banks in circuit.

One end of resistance bank 115 of bridge 105 is connected by lead 126 to the point 23 of bridge 89. The end of the associated resistance bank 108 is connected by lead 127 to point 24 of said brdige 105. The other point 23 of said bridge 105 is connected by lead 128 to movable arm 129 of section C of aircraft selector switch 131. Switch 131 desirably has two other sections, i. e., sections A and B, said sections A, B and C being associated respectively with the nose wheel and the two main wheels of the aircraft.

Each of the sections A and B also has a movable arm 132 and 133 respectively, said arms being ganged together with movable arm 129 of section C and with the movable arm 78 of multiplier switch 79 so that said arms will move in unison upon setting of the knob 134 to the aircraft type position.

Each of the sections A, B and C of switch 131 has a plurality of fixed contacts 135 which may be selectively engaged by the associated movable arms 132, 133 and 129 respectively. Each section has a plurality of resistances, two of which are illustratively shown and designated 136 and 137, connected respectively at one end to an associated contact 135. The other ends of said resistances are connected to an associated common lead 138, 139 and 141 respectively.

Common lead 141 of section C of switch 131 is connected by lead 142 to one end of resistance 56, the movable arm 46 of which is connected by lead 143 to positive main 59. Point 23 of Wheatstone bridge 103 and point 24 of Wheatstone bridge 104 are connected by leads 144 and 145 respectively to movable arms 132 and 133 of sections A and B of switch 131. The common leads 138 and 139 of said sections A and B are connected by leads 146 and 147 respectively to one end of resistances 49 and 53, the movable arms 39 and 43 of which are connected to positive main 59 as by leads 148 and 149 respectively.

The conducting rings 109, 111 and 112 of the bridges 103, 104 and 105 are connected by leads 151, 152 and 153 respectively to positive main 59 and conducting ring 116 of bridge 103 is also connected to positive main 59. One end of resistance bank 106 of bridge 103 is connected by lead 154 to point 24 of said bridge. One end of resistance bank 113 of bridge 103 is connected by lead 155 to conducting ring 117 of bridge 104. One end of resistance bank 107 of bridge 104 is connected by lead 156 to point 24 of said bridge 104, and one end of resistance bank 114 is connected by lead 157 to conducting ring 118 of bridge 105.

The movable arm 41 of one of the scales (Fig. 2), i. e., scale 35 associated with the nose weight, is connected by lead 158 to positive main 59. One end of resistance bank 51 is connected by lead 159 to movable arm 44 of scale 36 and one end of resistance bank 54 is connected by lead 161 to movable arm 47 of scale 37. Thus the resistance banks 51, 54 and 57 are connected in series and one end of resistance bank 57 is connected by lead 162 to point 23 of Wheatstone bridge 163.

Point 24 of bridge 163 is connected by lead 164 to movable arm 165 of fuel consumption switch 166, said movable arm being controlled by means of a knob 167. The switch has a plurality of fixed contacts 168, one of which is directly connected to common lead 169 and the others of which each has the end of a resistance 171 affixed thereto respectively, with the other ends of said resistances being connected to said common lead 169. Although any number of resistances 171 could be provided, depending upon the number of increments of weight relating to fuel consumption, but two resistances 171a and 171b are illustratively identified.

Common lead 169 of switch 166 is connected by lead 172 to one end of annular resistance bank 173, desirably mounted on panel 34 of bridge 163. Also mounted on panel 34 concentric with resistance bank 173 is a conducting ring 174, a second annular resistance bank 175 and a second conducting ring 176. The conducting rings 174 and 176 are both desirably connected to positive main 59 and one end of resistance 175 is connected by lead 177 to one end of an annular resistance bank 178 mounted on a panel 34 associated with Wheatstone bridge 179. The drum 33 associated with bridge 163 mounts a pair of spaced wiper arms 181 and 182 insulated from each other and contacting resistance bank 173 and conducting ring 174; and resistance bank 175 and conducting ring 176 respectively. Thus, depending upon the position of drum 33 and wiper arms 181 and 182, a predetermined amount of resistance banks 173 and 175 will be placed in circuit.

Also mounted on panel 34 of bridge 179 concentric with resistance bank 178 is a conducting ring 183 connected by lead 184 to movable arm 185 of multiplier switch 186 which is identical to multiplier switch 79, corresponding parts having the same reference numerals primed, said arm 185 being ganged to move in unison with arm 78 of switch 79 upon rotation of knob 134. The common lead 83' of switch 186 is connected by lead 187 to point 23 of Wheatstone bridge 179.

The drum 33 of bridge 179 carries a wiper arm 188 contacting resistance bank 178 and conducting ring 183 so that depending upon the position of the drum and the wiper arm 188, a predetermined amount of resistance bank 178 will be placed in circuit. Point 24 of bridge 179 is connected by lead 189 to one end of annular resistance bank 191 mounted on panel 34 of bridge 98. Also mounted on panel 34 concentric with resistance 191 is a conducting ring 192, a second annular resistance bank 193 and a second conducting ring 194.

The conducting rings 192 and 194 are both connected to positive main 59. One end of resistance bank 193 is connected by lead 195 to movable arm 196 of a second aircraft selector switch 197, said arm 196 being ganged to move in unison with the arms of selector switch 131 upon setting of the latter by control knob 134.

Switch 197 has a plurality of fixed contacts 198 which may successively be engaged by movable arm 196. The contacts 198 are connected respectively by a plurality of leads 199 to the movable arms 201 of a fuel moment switch 202. This switch has a plurality of sections corresponding to the number of types of aircraft to be measured by the equipment, two sections A and B being illustratively shown, each having a movable arm 201 ganged to move in unison with the movable arm 165 of fuel consumption switch 166.

Each of the sections of switch 202 has a plurality of fixed contacts 203 which may selectively be engaged by the associated movable arms 201. One of the fixed contacts is directly connected to an associated common lead 204 and each of the other fixed contacts has a resistance connected thereto at one end, two resistances 205a, 205b, being illustratively designated. The free end of the resistances 205 of each section is connected to an associated common lead 204, said leads being connected together by lead 206, the leads 204 being connected by lead 207 to point 23 of bridge 98.

The drum 33 of bridge 98 carries a pair of wiper arms 208, 209 insulated from each other and designed to contact resistance bank 193 and conducting ring 194; and resistance bank 191 and conducting ring 192 respectively so that depending upon the position of drum 33 and wiper arms 208, 209 carried thereby, a predetermined amount of resistance banks 193 and 191 will be placed in circuit.

In the circuit shown in Figs. 1 and 2, the nose of the aircraft is selected as the reference datum. The center of gravity may also be determined by selecting a reference datum other than the nose of the aircraft. Thus, in the embodiment shown in Fig. 3, the main wheels are selected as the reference datum and in such case only the moment of the nose wheel need be taken into account to determine the center of gravity.

The equipment shown in Fig. 3 also utilizes a plurality of substantially identical Wheatstone bridge circuits. Each bridge has a pair of balancing resistances 231, 232 connected at one end to points 233 and 234 of the associated bridge with the other ends of said resistances being connected to negative main 235.

A servo-amplifier 236 connected by input leads 237 and 238 respectively, to points 233 and 234 of each bridge is connected by lead 239 to a servo-motor 241. Motor 241 is operatively connected by means of a shaft 242 to a rotatable member desirably a drum 243 which carries wiper arms to engage associated resistances and conducting rings mounted on an associated upright panel 244 so that depending upon the position of the drum and the wiper arms, a predetermined amount of resistance may be placed in circuit.

The equipment desirably comprises a plurality of weighing scales of any suitable type, three weighing scales being illustratively shown, designated by the numerals 245, 246 and 247 to measure the weight on the nose wheel and two main wheels respectively.

In the illustrative embodiment herein shown, scale 245 associated with the nose wheel, controls a set of three movable contact arms 248, 249 and 251 and the scales 246 and 247 associated with the main wheels each controls a single movable arm 252 and 253 respectively.

The movable contact arms 248, 249 and 251 coact with associated resistance banks 254, 255 and 256 respectively, and movable contact arms 252 and 253 coact with resistance banks 257 and 258, said movable arms placing in circuit that portion of the associated resistance bank related to the value of the weight being measured. The movable arm 248 of one of the scales, i. e., the scale 245, is connected by lead 259 to positive main 261. One end of resistance bank 254 is connected by lead 262 to movable arm 252 of scale 246 and one end of resistance bank 257 is connected by lead 263 to movable arm 253 of scale 247. Thus, the resistance banks 254, 257 and 258 are connected in series.

One end of resistance bank 258 is connected by lead 264 to point 233 of Wheatstone bridge 265. Point 234 of bridge 265 is connected by lead 266 to one end of an annular resistance bank 267 desirably a continuous length of wire mounted on supporting panel 244. Also mounted on panel 244 concentric with resistance bank 267 is a conducting ring 268, a second annular resistance bank 269 and associated conducting ring 271 and a third annular resistance bank 272 and associated conducting ring 273. The conducting rings 268, 271 and 273 are desirably connected to positive main 261. One end of resistance bank 269 is connected by lead 274 to one end of an annular resistance bank 275 desirably mounted on insulating panel 244 associated with Wheatstone bridge 276 and one end of resistance bank 272 is connected by lead 277 to point 233 of Wheatstone bridge 278.

The drum 243 associated with bridge 265 carries a plurality of longitudinally spaced wiper arms 279, 281 and 282 insulated from each other and designed to contact resistance bank 272 and conducting ring 273; resistance bank 269 and conducting ring 271 and resistance bank 267 and conducting ring 268, respectively. Thus, depending upon the position of drum 243 and the wiper arms 279, 281 and 282, a predetermined amount of the associated resistance banks will be placed in circuit.

Also mounted on panel 244 of bridge 276 concentric with annular resistance 275 is a conducting ring 283 connected by lead 284 to point 233 of bridge 276. Point 234 of bridge 276 is connected by lead 285 to common lead 286 of aircraft selector switch 287. The switch 287 has a plurality of fixed contacts 288 which may be selectively engaged by a movable contact arm 289 controlled by a suitable knob 291. Each fixed contact has a resistance 292 connected at one end thereto respectively, the other ends of said resistances being connected to common lead 286. In the illustrative embodiment herein, two resistances 292 are designated 292a, 292b.

Movable arm 289 is connected by lead 293 to one end of resistance 255, the movable scale arm 249 engaging said resistance being connected to positive main 261.

The drum 243 associated with bridge 276 desirably carries a wiper arm 294 designed to contact resistance bank 275 and conducting ring 283 so that depending upon the position of drum 243 and wiper arm 294, a predetermined amount of resistance bank 275 will be placed in circuit. Point 234 of bridge 278 is connected by lead 295 to common lead 296 of fuel consumption switch 297. Switch 297 has a plurality of fixed contacts 298 which may selectively be engaged by movable arm 299. One of the fixed contacts 298 is directly connected to common lead 296 and each of the other fixed contacts 298 has one end of an associated resistance 301a, 301b, etc. connected thereto respectively, the other ends of said resistances being connected to common lead 296.

Movable arm 299 is connected by lead 302 to one end of annular resistance bank 303 mounted on panel 244 of bridge 278. Also mounted on panel 244 concentric with resistance bank 303 is a conducting ring 304, a second annular resistance bank 305 and a second conducting ring 306. The conducting rings 304 and 306 are both desirably connected to positive main 261 and one end of resistance bank 305 is connected by lead 307 to one end of annular resistance bank 308 mounted on panel 244 associated with bridge 309. Drum 243 of bridge 278 desirably mounts a pair of wiper arms 311 and 312 insulated from each other and designed to contact resistance bank 303 and conducting ring 304; and resistance bank 305 and conducting ring 306 respectively so that depending upon the position of said drum and the wiper arms 311, 312, a predetermined amount of the associated resistance banks will be placed in circuit.

Also mounted on panel 244 of bridge 309 concentric with resistance bank 308 is a conducting ring 313 connected by lead 314 to point 233 of bridge 309. Point 234 of bridge 309 is connected by lead 315 to one end of annular resistance bank 316 mounted on panel 244 of bridge 317.

Drum 243 of bridge 309 carries a wiper arm 318 engaging resistance 308 and conducting ring 313 so that depending upon the position of the drum and the wiper arm, a predetermined amount of resistance 308 will be placed in circuit.

Point 234 of bridge 317 is connected by lead 319 to movable arm 321 of a selector switch 322, said movable arm 321 being ganged with movable arm 289 of switch 287 and controlled by knob 291. Arm 321 is designed successively to engage a plurality of fixed contacts 323 connected respectively to the leads 324 to the movable arms 325 of fuel consumption moment switch 326, said arms 325 being ganged with the movable arm 299 of fuel consumption switch 297 so that said arms will move in unison upon rotation of knob 327.

The switch 326 desirably comprises a plurality of sections depending upon the number of types of aircraft to be measured by the equipment. In the illustrative embodiment, the switch has two sections A and B. Each section has a plurality of fixed contacts 328 selectively engaged by the associated movable contact arm 325. One of the contacts 328 of each section is connected directly to an associated common lead 329. The other fixed contacts of section A of switch 326 are connected respectively to one end of a plurality of resistances 331a, 331b, etc., the other end of said resistances being connected to the associated common lead 329. The common leads 329 are connected by lead 332 and common lead 329 is connected by lead 333 to one end of annular resistance bank 334 also mounted on panel 244 of bridge 317. The annular resistance banks 316 and 334 each has an associated conducting ring 335 and 336 mounted on said panel 244, said conducting rings being connected to positive main 261.

Drum 243 of bridge 317 mounts a pair of wiper arms 337 and 338 insulated from each other and designed to engage resistance bank 334 and conducting ring 336; and resistance bank 316 and conducting ring 335 respectively, so that depending upon the position of the drum and the wiper arms, a predetermined amount of the associated resistance will be placed in circuit.

The point 233 of bridge 317 is connected by lead 339 to annular resistance bank 341 mounted on panel 244 of bridge 342. Also mounted on said panel 244 concentric with resistance bank 341 is a conducting ring 343, a second annular resistance bank 344 and a second conducting ring 345. The conducting rings 343 and 345 are both connected to positive main 261. One end of annular resistance bank 344 is connected by lead 346 to point 234 of bridge 342.

Point 233 of bridge 342 is connected by lead 347 to movable arm 348 of aircraft selector switch 349. Movable arm 348 is ganged with movable arm 289 of switch 287 and with movable arm 321 of switch 322 so that said arms will move in unison. Switch 349 is identical to switch 287 and corresponding parts have the same reference numerals primed. Common lead 286' is connected by lead 351 to one end of resistance 256, the movable scale arm 251 engaging said resistance being connected to positive main 261.

Drum 243 of bridge 342 carries a pair of wiper arms 352 and 353 insulated from each other and designed to engage resistance bank 344 and conducting ring 345; and resistance bank 341 and conducting ring 343 respectively, so that depending upon the position of the drum 243 and wiper arms 352 and 353, a predetermined amount of resistance 344 and 341 will be placed in circuit.

In the circuits shown in Figs. 1 and 2 and in Fig. 3, but three weighing scales are provided. In the circuit shown in Fig. 4, four weighing scales 361, 362, 363 and 364 are provided which are so spaced that any one of the scales may carry the nose wheel of the aircraft to be measured and two of the remaining three scales will carry the two main wheels. Thus, the aircraft may be so positioned on the scales that it is at substantially right angles to the direction of the wind, to minimize the effect thereof on the weight of the aircraft as indicated by the scales.

The circuit shown in Fig. 4 utilizes a pair of substantially identical Wheatstone bridge circuits. Each bridge has a pair of balancing resistances 362 and 363 connected at one end to points 364 and 365 of the associated bridge with the other ends of said resistances being connected to negative main 366.

A servo-amplifier 367, connected by input leads 368 and 369 respectively to points 364 and 365 of each bridge, is connected by lead 371 to a servomotor 372. Motor 372 is operatively connected by means of a shaft 373 to a rotatable member, desirably a drum 374 which carries wiper arms to engage associated resistances and conducting rings mounted on an associated panel 375 so that depending upon the position of the drum and the wiper arms, a predetermined amount of resistance may be placed in circuit.

In the illustrative embodiment, the scales 361, 362, 363 and 364 each controls a pair of movable contact arms 376, 377; 378, 379; 381, 382 and 383, 384, respectively. The contact arms 376, 378, 381 and 383 coact with associated resistance banks 385, 386, 387 and 388 respectively and the contact arms 377, 379, 382 and 384 coact with associated resistance banks 389, 391, 392 and 393 respectively, said movable arms placing in circuit that portion of the associated resistance bank related to the value of weight being measured.

One end of resistance bank 389 is connected to positive main 394. The movable arm 377 of scale 361 is connected by lead 395 to one end of resistance bank 391. The movable arm 379 of scale 362 is connected by lead 396 to one end of resistance bank 392. The movable arm 382 of scale 363 is connected by lead 397 to one end of resistance bank 393. Thus, the resistance banks 389, 391, 392 and 393 are connected in series.

The movable arm 384 of scale 364 is connected by lead 398 to point 364 of Wheatstone bridge 399. Point 365 of bridge 399 is connected by lead 401 to one end of annular resistance bank 402 mounted on panel 375 of bridge 399. Also mounted on panel 375 concentric with resistance bank 402 is a conducting ring 403, a second annular resistance bank 404 and a second conducting ring 405. The conducting rings 403 and 405 are both desirably connected to positive main 394. One end of annular resistance bank 404 is connected by lead 406 to one end of annular resistance bank 407, desirably mounted on insulating panel 375 associated with bridge 408.

The drum 374 associated with bridge 399 carries a pair of wiper arms 409 and 411 insulated from each other and designed to contact resistance bank 402 and conducting ring 403; and resistance bank 404, and conducting ring 405, respectively. Thus, depending upon the position of drum 374 and wiper arms 409 and 411, a predetermined amount of the associated resistances will be placed in circuit.

Also mounted on panel 375 of bridge 408 concentric with resistance bank 407 is a conducting ring 412 connected by lead 413 to point 365 of bridge 408. The drum 374 associated with bridge 408 carries a wiper arm 414 designed to contact resistance bank 407 and conducting ring 412. Thus, depending upon the position of drum 374 and wiper arm 414 a predetermined amount of resistance 407 will be placed in circuit.

One end of each of the resistance banks 385, 386, 387 and 388 is connected to positive main 394. The movable arms 376, 378, 381 and 383 associated with said resistance banks respectively, are connected to fixed contacts 415, 416, 417 and 418 of relays 419, 421, 422 and 423 respectively. The movable arms 424, 425, 426 and 427 of said relays are connected together by lead 428, which in turn is connected to movable arm 429 of aircraft selector switch 431.

Arm 429 selectively engages a plurality of fixed contacts 432 connected respectively to one end of a plurality of resistances 433, 434, etc., the other end of said resistances being connected to common lead 435 which is connected by lead 436 to point 364 of bridge 408.

The scales 361, 362, 363 and 364 each controls a normally open micro-switch 437, 438, 439 and 441 respectively, the movable contact arms 442, 443, 444 and 445 of which are connected to positive main 394. The fixed contacts 446, 447, 448 and 449 of said micro-switches are connected respectively by leads 451, 452 and 453 and 454 to one side of the coils 455, 456, 457 and 458 of relays 459, 461, 462 and 463, the other side of said coils being connected to negative main 366.

The relay 459 has a fixed contact 464 and a movable contact arm 465 normally spaced therefrom; the relay 461 has a pair of fixed contacts 466, 467 each having a movable contact arm 468, 469 normally spaced from the associated fixed contact and ganged to move in unison; the relay 462 has three fixed contacts 471, 472, 473, each having a movable contact arm 474, 475, 476 normally spaced therefrom and ganged to move in unison and the relay 463 also has three fixed contacts 477, 478 and 479 each having a movable contact arm 481, 482, 483, normally spaced therefrom and ganged to move in unison.

Fixed contact 464 of relay 459 is connected to positive main 394. Movable arm 465 is connected by lead 484 to fixed contact 466 of relay 461 and by leads 484, 485 to fixed contact 472 of relay 462. Movable arm 468 of relay 461 is connected by leads 486 and 487 to fixed contacts 477 and 471 of relays 463 and 462 respectively. Fixed contact 467 of relay 461 is connected to positive main 394 and movable arm 469 is connected by lead 488 to fixed contact 473 of relay 462.

Movable arm 474 of relay 462 is connected by lead 489 to one side of coil 491 of relay 421. Movable arms 475 and 476 of relay 462 are connected by leads 492 and 493 to fixed contacts 478 and 479 of relay 463. Movable arms 481, 482 and 483 of relay 463 are connected by leads 494, 495 and 496 respectively to one side of coils 497, 498 and 499 of relays 419, 422 and 423 and the other side of coils 497, 491, 498 and 499 are connected to negative main 366 to complete the circuit.

*Calculation of resistances*

In determining the value of the resistances utilized in the circuits above described, the following limits for the equipment will be assumed.

I

| Weight on Scale in Pounds | Minimum | Maximum |
| --- | --- | --- |
| Nose Wheel | 4,000 | 20,000 |
| Left Main Wheel | 15,000 | 70,000 |
| Right Main Wheel | 15,000 | 70,000 |

II

| Distance in Inches along Logitudinal Axis from Nose of Aircraft to— | Minimum | Maximum |
| --- | --- | --- |
| Nose wheel | 100 | 160 |
| Main Wheels | 430 | 610 |

To determine the value of the resistance banks 49, 53, 56 of Figs. 1 and 2; resistance banks 255 and 256 of Fig. 3 and resistance banks 385, 386, 387 and 388 of Fig. 4, the logarithm of the weight to be applied to the scales associated with such resistance banks is determined and such logarithm is multiplied by 1,000 for ease in calculation.

For the circuits shown in Figs. 1 and 2 and in Fig. 3, the following tabulation can be made:

III

| Weight in Pounds on— | Min. | Log. | Res. | Max. | Log. | Res. |
|---|---|---|---|---|---|---|
| Nose Wheel | 4,000 | 3.602 | 3,602 | 20,000 | 4.301 | 4,301 |
| Left Main Wheel | 15,000 | 4.176 | 4,176 | 70,000 | 4.845 | 4,845 |
| Right Main Wheel | 15,000 | 4.176 | 4,176 | 70,000 | 4.845 | 4,845 |

Thus, the value of resistance banks 49, 255 and 256 will be from 3,602 ohms to 4,031 ohms and the value of resistance banks 53 and 56 will be from 4,176 to 4,845 ohms.

For the circuit shown in Fig. 4, as any one of the scales can carry the nose wheel or a main wheel, the resistance banks 385, 386, 387 and 388 must cover the range between the minimum weight of 4,000 pounds and the maximum weight of 70,000 pounds and the value of each of such resistance banks is from 3,602 ohms to 4,845 ohms.

Each 100 pounds of weight to be applied to the scale associated with each resistance is made to correspond to one ohm of resistance in ascertaining the value of the resistance banks 48, 52, 55 and 51, 54, 57 of Figs. 1 and 2; resistance banks 254, 257, 258 of Fig. 3 and resistance banks 389, 391, 392, 393 of Fig. 4.

For the circuits shown in Figs. 1 and 2 and in Fig. 3, the following tabulation can be made:

IV

| Weight in Pounds on— | Min. | Res. | Max. | Res. |
|---|---|---|---|---|
| Nose Wheel | 4,000 | 40 | 20,000 | 200 |
| Left Main Wheel | 15,000 | 150 | 70,000 | 700 |
| Right Main Wheel | 15,000 | 150 | 70,000 | 700 |

Thus, the value of resistance banks 48, 51 and 254 will be from 40 to 200 ohms, and the value of resistance banks 52, 55, 54, 57, 257, 258 will be from 150 to 700 ohms.

For the circuit shown in Fig. 4 as any one of the scales can carry the nose wheel or a main wheel, the resistance banks 389, 391, 392 and 393 must cover the range between the minimum weight of 4,000 pounds and the maximum weight of 70,000 pounds and the value of each of such resistance banks is from 40 to 700 ohms.

To determine the values:

(a) Of the successive resistances 136, 137, etc. of sections A, B and C of switch 131, shown in Figs. 1 and 2, associated respectively with the distance along the longitudinal axis from the nose of the aircraft to the nose wheel and to each of the main wheels;

(b) Of the successive resistances 292a, 292b of switches 287 and 349 shown in Fig. 3, and of the successive resistances 433, 434 of switch 431 shown in Fig. 4, said resistances being associated with the distance along the longitudinal axis from the main wheels to the nose wheel;

the logarithm of each distance is determined and multiplied by 1,000.

For the circuit shown in Figs. 1 and 2, the following tabulation may be made:

V

| Distance in Inches From Nose of Aircraft to— | Min. | Log. | Res. | Max. | Log. | Res. |
|---|---|---|---|---|---|---|
| Nose Wheel | 100 | 2.000 | 2,000 | 160 | 2.204 | 2,204 |
| Left Main Wheel | 430 | 2.633 | 2,633 | 610 | 2.785 | 2,785 |
| Right Main Wheel | 430 | 2.633 | 2,633 | 610 | 2.785 | 2,785 |

Thus, the values of resistances 136 and 137 of section A of switch 131 for two types of aircraft with the minimum and maximum limits above set forth are 2,000 and 2,204 ohms respectively, the values of resistances 136 and 137 of sections B and C are 2,633 and 2,785 ohms respectively.

For the circuits shown in Figs. 3 and 4, the following tabulation may be made:

VI

| | Min. | Log. | Res. | Max. | Log. | Res. |
|---|---|---|---|---|---|---|
| Distance in Inches from Main Wheels to Nose Wheel | 330 | 2.519 | 2,519 | 450 | 2.653 | 2,653 |

Thus, the values of resistances 292a and 433 is 2,519 ohms and the value of resistance 292b and 434 is 2,653 ohms.

With the nose of the aircraft as the reference datum, as is used in the circuit shown in Figs. 1 and 2, the moments about the nose due to the weight on the nose wheel and each of the two main wheels may be determined by multiplying the weight on the wheel by its distance from the nose of the aircraft and the total moment may be found by adding the individual moments.

The logarithm of the individual moments may be found by adding the logarithms of the weight on the wheel and the logarithm of the distance of such wheel from the nose of the aircraft and such logarithm is multiplied by 1,000. The following tabulation may be made:

VII

| Logarithm of Moment at— | Minimum | Maximum |
|---|---|---|
| Nose Wheel | $(3.602+2.000)\times 1,000=$ 5,602 | $(4.301+2.204)\times 1,000=$ 6,505 |
| Left Main Wheel | $(4.176+2.633)\times 1,000=$ 6,809 | $(4.845+2.785)\times 1,000=$ 7,630 |
| Right Main Wheel | $(4.176+2.633)\times 1,000=$ 6,809 | $(4.845+2.785)\times 1,000=$ 7,630 |

Thus the value of resistance banks 106, 107 and 108 of bridges 103, 104 and 105 respectively, associated with the nose wheel moment and each of the two main wheel moments is from 5,602 to 6,505 ohms and from 6,809 to 7,630 ohms respectively.

In determining moments, if 10,000 inch/pounds is made to correspond to one ohm, the value of resistance banks 113, 114 and 115 of bridges 103, 104 and 105 of Fig. 1 may be determined as follows:

VIII

| Moment | Minimum | Maximum |
|---|---|---|
| Nose Wheel | $\frac{100\times 4,000}{10,000}=40$ | $\frac{160\times 20,000}{10,000}=320$ |
| Left Main Wheel | $\frac{430\times 15,000}{10,000}=645$ | $\frac{610\times 70,000}{10,000}=4,270$ |
| Right Main Wheel | $\frac{430\times 15,000}{10,000}=645$ | $\frac{610\times 70,000}{10,000}=4,270$ |

Thus, the value of resistance bank 113 is from 40 to 320 ohms and the values of each resistance bank 114 and 115 is from 645 to 4,270 ohms.

As the resistance banks 334 of bridge 317 and resistance bank 341 of bridge 342 of Fig. 3 respond respectively to the take off moment and landing moment and as the minimum moment of the circuit shown in Fig. 3 is equal to 330 times 4,000 or 1,320,000 and the maximum moment, 450 times 20,000 or 9,000,000 and since 10,000 inch pounds corresponds to one ohm, the value of resistance banks 334 and 341 is from 132 to 900 ohms.

To find the sum of the individual moments due to the weight on the nose wheel and each of the two main wheels, the individual moments are added by connecting the resistances 113, 114 and 115 in series in Figs. 1 and 2. The resistance bank 93 of bridge 89 covers the range from the minimum to the maximum sum of the moments divided by 10,000. Thus the minimum moment is equal to 1,330 ohms and the maximum moment is equal to 8,860 ohms and the value of resistance bank 93 on bridge 89 is from 1,330 to 8,860 ohms.

The resistance banks 88 and 95 of bridge 89 and resistance bank 193 of bridge 98 of Figs. 1 and 2 extend from the logarithm multiplied by 1,000 of the minimum total moment to that of the maximum total moment. The following tabulation may be made:

IX

Minimum moment = 400,000+6,450,000+6,450,000
= 13,300,000
1,000 log.13,300,000 = 7,124
Maximum moment = 3,200,000+42,700,000+42,700,000 = 88,600,000
1,000 log.88,600,000 = 7,947

Thus, the value of resistance banks 88, 95 and 193 is from 7,124 to 7,947 ohms.

The resistance banks 344 and 316 of bridges 342 and 317 of Fig. 3 extend from the logarithm times 1,000 of the minimum total moment to that times 1,000 of the maximum total moment. The following tabulation may be made:

X

Minimum moment = 330×4,000 = 1,320,000
1,000 log.1,320,000 = 6,121
Maximum moment = 450×20,000 = 9,000,000
1,000 log.9,000,000 = 6,954

Thus, the value of resistance banks 344 or 316 extends from 6,121 to 6,954 ohms.

To determine the sum of the weights on the nose wheel and the two main wheels, the resistances associated with such weights are connected in series. The value of resistance bank 66 of bridge 64 and resistance bank 173 of bridge 163 of Figs. 1 and 2, of resistance bank 267 and 272 of bridge 265 and resistance bank 303 of bridge 278 of Fig. 3 and of resistance bank 402 of bridge 399 of Fig. 4 extends from the minimum to the maximum sum of such weights. If each 100 pounds of weight to be applied to the scale associated with each resistance is made to correspond to one ohm of resistance, we find:

XI

| Weight on— | Minimum | Maximum |
|---|---|---|
| Nose Wheel | 4,000 | 20,000 |
| Left Main Wheel | 15,000 | 70,000 |
| Right Main Wheel | 15,000 | 70,000 |

Total minimum weight divided by 100 = 340.
Total maximum weight divided by 100 = 1,600.

Thus, the value of resistance banks 66, 173, 267, 272, 303 and 402 is from 340 to 1,600 ohms.

The value of resistance bank 68 of bridge 64, and resistance bank 175 of bridge 163 of Figs. 1 and 2; of resistance bank 269 of bridge 265 and resistance bank 305 of bridge 278 of Fig. 3 and of resistance bank 404 of bridge 399 of Fig. 4 is determined by ascertaining the logarithm of the minimum total weight and maximum total weights and multiplying such logarithm by 1,000.

XII

| | Log. | Res. |
|---|---|---|
| Weight Minimum: 34,000 | 4.531 | 4,531 |
| Weight Maximum: 160,000 | 5.204 | 5,204 |

Thus, the values of resistance banks 68, 175, 269, 305 and 404 is from 4,531 to 5,204 ohms.

The resistances 171a, 171b of fuel consumption switch 166 of Figs. 1 and 2, and resistances 301a and 301b of fuel consumption switch 297 of Fig. 3 are related to predetermined amounts of fuel consumed. Thus, for example, resistances 171a and 301a are related to 500 gallons or 3,000 pounds and resistances 171b and 301b to 1,000 gallons or 6,000 pounds. To determine the values of such resistances, the weight of fuel is divided by 100. Thus, the following tabulation can be made:

XIII

| Fuel Consumed | Weight, pounds | Resistance, ohms |
|---|---|---|
| 500 gallons | 3,000 | 30 |
| 1,000 gallons | 6,000 | 60 |

The resistances 205a and 205b of sections A and B of switch 202 of Fig. 2 and the resistances 331a and 331b of switch 326 of Fig. 3 are related to predetermined moments of the fuel consumed.

Assuming that the nose of the aircraft has been selected as the reference datum and the average distance of the fuel is 402 inches from the nose for a type A aircraft and 600 inches for a type B aircraft, the following tabulation can be made in determining the landing center of gravity:

XIV

TYPE A AIRCRAFT

| Fuel consumed | Weight | Moment | Resistance |
|---|---|---|---|
| 500 | 3,000 | 3,000×402=1,206,000 | 120.6 |
| 1,000 | 6,000 | 6,000×402=2,412,000 | 241.2 |

TYPE B AIRCRAFT

| | | | |
|---|---|---|---|
| 500 | 3,000 | 3,000×600=1,800,000 | 180 |
| 1,000 | 6,000 | 6,000×600=3,600,000 | 360 |

The values of resistance 205a of section A of switch 202 is 120.6 ohms; resistance 205b of section A has a value of 241.2 ohms. Resistance 205a of section B has a value of 180 ohms and resistance 205b of section B has a value of 360 ohms.

Assuming that the main wheels of the aircraft have been selected as the reference datum and the average distance of such fuel is 402 inches from the nose or 28 inches from the main wheels for a type A aircraft and 600 inches from the nose or 10 inches from the main wheels for a type B aircraft, the following tabulation can be made:

XV

TYPE A AIRCRAFT

| Fuel consumed | Weight | Moment | Resistance |
| --- | --- | --- | --- |
| 500 | 3,000 | 3,000×28=84,000 | 8.4 |
| 1,000 | 6,000 | 6,000×28=168,000 | 16.8 |

TYPE B AIRCRAFT

| 500 | 3,000 | 3,000×10=30,000 | 3 |
| --- | --- | --- | --- |
| 1,000 | 6,000 | 6,000×10=60,000 | 6 |

The value of resistance 331a of section A of switch 326 is 8.4 ohms, resistance 331b of section A has a value of 16.8 ohms. Resistance 331a of section B has a value of 3 ohms and resistance 331b of section B has a value of 6 ohms.

To determine the distance of the center of gravity of the aircraft, from a given reference datum, the total moment is divided by the total weight. This may be expressed by the formula:

Log.$CG$ = log.total moment − log.total weight or

Log.total moment = log.total weight + log.$CG$

The resistance banks 72 and 128 of the two bridges 73 and 179 related to center of gravity extend from the logarithm multiplied by 1,000 of a value somewhat below the minimum distance of the center of gravity from the reference datum to a value somewhat in excess of the maximum distance.

As such minimum and maximum distances of the center of gravity for the type A aircraft are 380 and 400 inches, the resistance values of resistance banks 72 and 128 are set to a range of from 360 to 420 inches. The following tabulation can be made:

XVI

|  | Log. | Res. |
| --- | --- | --- |
| Minimum C. G., 360 | 2.556 | 2,556 |
| Maximum C. G., 420 | 2.623 | 2,623 |

Thus, the values of resistance bank 72 of bridge 73 and resistance bank 178 of bridge 179 are from 2,556 to 2,623 ohms.

In order that the resistance banks 72 and 178 of value from 2,556 to 2,623 ohms may be used to indicate the center of gravity for the larger type B aircraft, the following calculations are made:

The center of the scale for the center of gravity of the type A aircraft is midway between 360 and 420, i. e., 390 inches. Let it be assumed that the center of the scale for the type B aircraft is 565 inches.

The logarithm of the ratio of the two centers of the scales is $$\log. \frac{565}{390} = .161$$

which, when multiplied by 1,000 equals 161 ohms. This value is the multiplying factor for utilizing the resistance banks 72 and 178 of 2,556 to 2,623 ohms for the type B aircraft. Thus, the value of resistances 84a and 84'a of multiplying switches 79 and 186 are 161 ohms.

As mid-point on the scale for the center of gravity of a type A aircraft is 390, the logarithm of this amount multiplied by 1,000 is equivalent to 2,591 ohms. Similarly, the mid-point on the scale for the center of gravity of a type B aircraft is 565, the logarithm of which multiplied by 1,000 is equivalent to 2,752 ohms.

As the multiplying factor to convert the center of gravity scale from a type A aircraft to a type B aircraft is 161 ohms, this amount added to the ohmic value of the logarithm of the selected limits of 360 and 420 inches or 2,556 and 2,623 ohms respectively will give limits of 2,717 and 2,784 ohms.

The anti-logarithms of such resistances divided by 1,000 is 521 and 608 inches respectively. Thus, the limits of the scale for a type B aircraft is from 521 to 608 inches, which extends beyond the minimum and maximum limits of the type B aircraft, i. e., from 545 to 585 inches.

Thus one and the same center of gravity resistance bank can be utilized for any of a wide variety of aircraft types by introducing the appropriate multiplying factor according to the principle above set forth.

The drums 33 of bridges 73 and 179 through suitable mechanical or electrical means may rotate a pointer P shown in Fig. 7 which has a vertically adjustable rectangular panel 501 to the rear thereof. The panel 501 desirably has a plurality of distinct scales 502 one for each of the types of aircraft for which the system is adapted and the panel 501 is so controlled by the control knob 134 as by a gear and rack arrangement 503 as to cause the correct scale to enter into registry with the pointer P upon turning the knob to the selected type aircraft.

The indications on the scale markings may be spread over only 180 degrees of arc for example, to facilitate ease in reading regardless of the number of types of aircraft to be measured by the equipment.

While it is preferred to utilize a plurality of distinct scales to indicate the center of gravity position for various types of aircraft, by introducing an appropriate multiplier factor for each type larger than the smallest as above set forth, it is of course understood that a single scale could be employed to cover the entire range for various aircraft small and large with the omission of the multiplying factor.

Thus, as the distance of the center of gravity from the reference datum found by the circuits shown in Figs. 3 and 4 is with respect to the main wheels, the range of resistance banks 275, 308 and 407 may be equal to 1,000 times the logarithms of the distances of the centers of gravity therefrom between limits which extend beyond the minimum and maximum to be measured, to give the range of resistance values for resistance banks 275, 308 and 407.

As previously described, the type B aircraft has its range of center of gravity at most 608 inches and at least 521 inches from the nose, the distances of such centers of gravity from the main wheels being from 2 to 89 inches. The type A aircraft has its range of center of gravity at most 420 inches and at least 360 inches from the nose, the distance of such center of gravity from the main wheels being from 10 to 70 inches.

As the limits of center of gravity are from 2 inches to 89 inches, the following tabulation can be made:

XVII 1000 logarithm 2 = 301
1000 logarithm 89 = 1,949

Thus, the value of each resistance bank 275, 308 and 407 is from 301 to 1,949 ohms and the drums associated with said resistance banks are calibrated from 2 to 89 inches.

The indicating scale calibrated in inches for type A aircraft from 360 to 420 may be translated to percentage MAC as previously indicated so that both the center of gravity and percent MAC will be indicated.

For the type B aircraft if the indicating scale center of gravity range is from 521 to 608 inches and the leading edge of the MAC is 521 inches from the nose and has a width of 197 inches, the limiting values of MAC are:

$$CG = \frac{521-521}{197} \times 100 = 0\% \ MAC$$

$$CG = \frac{608-521}{197} \times 100 = 44.2\% \ MAC$$

Thus, the MAC indicating scale for the type B aircraft may be calibrated in percentages from 0 to 44.2 corresponding to a range of center of gravities of from 521 to 608 inches.

Operation

The basic principle of operation of the equipment will be clear from the following brief description of the circuit shown in Fig. 3.

The weight of the aircraft on the scales 245, 246 and 247 will place that portion of the series connected resistance banks 254, 257, and 258 in circuit of ohmic value equal to the total weight divided by 100. The weight resistance banks 254, 257 and 258 form one leg of bridge 265 and the resistance bank 267 forms another leg of said bridge which, when the bridge is balanced, is set to a resistance value corresponding to that of the series connected resistance banks and at the same time the associated resistance 269 is set to a value proportional to the logarithm of the weight and is in series with resistance bank 275 of bridge 276 to form one leg of said bridge.

The resistance bank 255 controlled by nose wheel scale 245 and the resistance 292a of switch 287 in series therewith are of ohmic values respectively proportional to the logarithm times 1,000 of the weight on the nose wheel scale and the distance of the nose wheel from the main wheel. The combined value of resistance bank 255 and resistance 292a is proportional to the logarithm times 1,000 of the moment of the nose wheel with respect to the main wheels and such series connected resistances form another leg of bridge 276.

As the bridge 276 will normally be unbalanced, the motor 241 will rotate drum 243 until a portion of resistance bank 275 will be placed in circuit that is equal in value to the difference between the combined values of resistance bank 255 and resistance 292a; and the value of resistance bank 269.

An indication correlated with resistance bank 275 which is the anti-logarithm of a multiple of the difference of resistance designates the position of the center of gravity of the aircraft as the quotient.

Specifically to illustrate the operation of the equipment above described, it will be applied to a type A aircraft of the following pertinent specifications:

(a) Nose wheel 100 inches from the nose.
(b) Main wheels 430 inches from the nose.
(c) Center of gravity limits from 380 inches to 400 inches from the nose.
(d) MAC has a width of 164 inches and its leading edge is 355 inches from the nose.

Referring to Figs. 1 and 2, the aircraft is positioned so that its nose wheel rests upon scale 35 and its two main wheels rest on scales 36 and 37 respectively. The knob 134 is turned to set the aircraft selector switch 131 to the type A position. As a result the scale on panel 501 (Fig. 7) associated with the type A aircraft will be moved into the range of pointer P. The movable arms 132, 133 and 129 of sections A, B and C of said switch engage the fixed contacts 135 associated with the respective resistances 136 and the movable arms 78 and 185 of multiplier switches 79 and 186 engage the associated fixed contacts 81 and 81' respectively. In addition, the movable arm 196 of switch 197 engages the associated fixed contact 198.

Each movable arm 39, 43 and 46 of the weighing scales will tap off that portion of the associated resistance banks 49, 53 and 56 of ohmic value equal to the logarithm of the weight multiplied by 1,000 as illustrated in tabulation III. Accordingly, assuming that the weight on scale 35 is 10,000 pounds and the weights on each of the scales 36 and 37 is 30,000 pounds, the values of resistance banks 49, 53 and 56 in circuit will be 4,000, 4,477 and 4,477 ohms respectively. Simultaneously, the movable arms 38, 42, 45 and 41, 44 and 47 of the scales will tap off that portion of the resistance banks 48, 52 and 55 and the resistances 51, 54, 57 of ohmic value equal to the weight divided by one hundred as illustrated by tabulation IV. Thus, the value of resistances 48 and 51; 52 and 54; 55 and 57; will be 100, 300 and 300 ohms respectively.

The resistances 136 of sections A, B and C of selector switch 131 placed in circuit by the rotation of the movable arms 132, 133 and 129 thereof for the type A position, are associated respectively with the distance from the nose of the aircraft to the nose wheel and to each of the main wheels. Such distances for the type A aircraft are as above noted, 100 inches to the nose wheel and 430 inches to each of the main wheels. The value of resistances 136, of sections A, B and C are equal to the logarithm of the related distance multiplied by 1,000 as illustrated in tabulation V. Thus, the value of resistances 136 of sections A, B and C are 2,000, 2,633 and 2,633 ohms respectively.

The resistance bank 49 and resistance 136 of section A of switch 131 which are connected in series from positive main 59 to point 23 form one leg of bridge 103 and the annular resistance bank 106 on panel 34 forms another leg of said bridge 103. As resistance bank 49 has a value of 4,000 ohms and resistance 136 of section A of the switch 131 has a value of 2,000 ohms, the total series resistance will be 6,000 ohms. Bridge 103 ordinarily will be unbalanced and current will flow through servo-amplifier 26 to energize servomotor 31. As a result, drum 33 will rotate until wiper arm 119 engages that portion of resistance 106 to place 6,000 ohms in circuit, when servomotor 31 is de-energized and drum 33 stops rotating. Thus, there is placed in circuit a resistance which is proportional to the logarithm of the product of the weight on the nose wheel and its distance from the reference datum.

At the same time wiper arm 121 taps off that portion of resistance bank 113 to place in circuit resistance equal to the actual moment of the nose wheel divided by 10,000 as illustrated in tabulation VIII rather than the logarithmic multiple of the moment on resistance 106. Thus, as the moment on the nose wheel is 100 inches times 10,000 pounds, the moment divided by 10,000 will equal 100 ohms which is the value of resistance 113 placed in circuit.

The resistance bank 53 and resistance 136 of section B of switch 131 which are connected in series from positive main 59 to point 23, form one leg of bridge 104 and the annular resistance bank 107 on the corresponding panel 34 forms another leg of said bridge. The resistance bank 56 and resistance 136 of section C of switch 131 which are connected in series from positive main 59 to point 23 form one leg of bridge 105 and the annular resistance bank 108 on corresponding panel 34 forms another leg of said bridge.

As resistance banks 53 and 56 each has a value of 4,777 ohms and resistances 136 of sections A and B of switch 131 each has a value of 2,634 ohms, the total series resistance of the corresponding legs will each be 7,411 ohms.

Bridges 104 and 105 will ordinarily be unbalanced and current will therefore flow through the associated servo-amplifier 26 to energize the servo-motor 31. As a result, the associated drum 33 will rotate until wiper arms 122 and 124 engage that portion of the associated resistance banks 107 and 108 respectively to place 7,411 ohms in circuit when servo-motor 31 is de-energized and drum 33 stops rotating.

At the same time wiper arms 123 and 125, respectively tap off that portion of resistance banks 114 and 115 respectively, to place in circuit resistance equal to the actual moment of each of the main wheels divided by 10,000 as illustrated in tabulation VIII. Thus, as the moment on each main wheel is 430 inches times 30,000 pounds, the moment divided by 10,000 will equal 1,290 ohms which is the value of each of the resistance banks 114 and 115 placed in circuit.

The resistances 113, 114 and 115 which are connected in series from positive main 59 to point 23 of bridge 89 form one leg of said bridge and have a total value of 2,680 ohms. Bridge 89 will ordinarily be unbalanced and current will therefore flow through the associated servo-amplifier 26 to energize servo-motor 31. As a result, drum 33 will rotate until wiper arm 101 engages that portion of resistance bank 93 to place in circuit 2,680 ohms, a multiple of the actual total moment, when servo-motor 31 is de-energized and drum 33 stops rotating.

At the same time wiper arm 102 will tap off that portion of resistance bank 88 to place in circuit resistance equal to the logarithm times 1,000 of the total moments of the weights on the nose wheel and two main wheels about the reference datum or 1,000,000 plus 12,900,000 plus 12,900,000 or 26,800,000. The logarithm of this sum times 1,000 equals 7,428 ohms which is the value of resistance bank 88 placed in circuit.

The resistance banks 48, 52 and 55 which are connected in series from positive main 59 to point 24 of bridge 64 have a total value of 700 ohms as previously pointed out, and form one leg of bridge 64. Bridge 64 will be ordinarily unbalanced and current will therefore flow through the associated servo-amplifier 26 to energize servo-motor 31. As a result, drum 33 will rotate until wiper arm 74 engages that portion of resistance bank 66 to place in circuit 700 ohms, a multiple of the actual total weight; when servo-motor 31 is de-energized drum 33 stops rotating.

At the same time wiper arm 75 will tap off that portion of resistance bank 68 to place in circuit resistance equal to the logarithm times 1,000 of the total weight of 70,000 pounds or 4,845 ohms, which is the value of resistance bank 68 placed in circuit.

As resistance bank 68 of bridge 64 and resistance bank 72 of bridge 73 are in series and form one leg and resistance bank 88 forms another leg of bridge 73, and as the value of resistance 68 has been set to 4,845 ohms and that of bank 88 to 7,428 ohms, as above described, bridge 73 will be ordinarily unbalanced. As a result, current will flow through the associated servo-amplifier 26 to energize servo-motor 31 and drum 33 of bridge 73 will rotate until wiper arm 86 engages that portion of resistance bank 72 to place in circuit the difference between 7,428 ohms and 4,845 ohms, i. e., 2,583 ohms. Thus servo-motor 31 is deenergized and drum 33 stops rotating.

Inasmuch as the resistance bank 88 is of ohmic value proportional to the logarithm of the total moment and resistance bank 68 is of ohmic value proportional to the logarithm of the total weight, the value of resistance bank 72 in circuit will be proportional to the logarithm of the distance of the center of gravity from the reference datum. The anti-logarithm of resistance 72, i. e., of 2,583 divided by 1,000 is 383 which is the actual distance from the reference datum of the center of gravity of the aircraft type A loaded as above described. The drum 33 of bridge 73 rotates the pointer P shown in Fig. 7 through transmission 503 to indicate such actual center of gravity position as 383 inches.

Since $$CG \text{ in percent } MAC = \frac{H-Y}{C} \times 100$$

the center of gravity determination for the type A aircraft above illustratively described is converted into percent MAC as follows:

$$CG \text{ in percent } MAC = \frac{383-355}{164} \times 100 = 17\% \; MAC$$

As the take off center of gravity is within the permissible limits of the MAC of the type A aircraft, i. e., between 380 and 400 or between 15.2 or 27.4%, the aircraft can take off safely.

During flight of the aircraft, the center of gravity will shift by reason of the reduction of the moment caused by the consumption of fuel.

Assuming that for a given flight the aircraft will consume 500 gallons or 3,000 pounds of fuel, to determine the landing center of gravity of the aircraft, it is merely necessary to turn knob 167 in order to set the fuel consumption switch 186 to 500 gallons. As a result, the movable arm 195 of switch 196 engages fixed contact 168 associated with resistance 171a and movable arms 201 of sections A and B of switch 202 will engage the fixed contacts 203 associated with a resistance 205a of each of the two sections A, B respectively.

By reason of the original setting of switch 187 to the type A position, resistance 205a of section A of switch 202 is in circuit, and the corresponding resistance of section B is inactive. Resistance 205a as indicated in tabulation XIV has a value of 120.6 ohms for a weight of 3,000 pounds located 402 inches from the nose of the aircraft.

As resnstance bank 95 is identical to resistance bank 93, the associated wiper arm 99 places in circuit a resistance equal to that of resistance bank 93 placed in circuit by its wiper arm 101, i. e., 2,680 ohms, which is a multiple of the actual total moment. Resistance bank 95 is connected at one end to positive main 59 and at its other end to point 24 of bridge 89 and forms one leg of said bridge. Resistance bank 193 on panel 34 of bridge 98 and resistance 205a of section A of switch 202 are connected in series between positive main 59 and point 23 of said bridge 98 and form another leg of said bridge.

Bridge 98 will ordinarily be unbalanced and current will flow through the associated servo-amplifier 26 to energize servo-motor 31. As a result drum 33 will rotate until wiper arm 208 engages that portion of resistance bank 193 to place in circuit the difference between 2,680 ohms (resistance bank 95) and 120.6 ohms (resistance 205a), i. e., 2,559.4 ohms which is the value of resistance bank 193 placed in circuit. When this occurs servo-motor 31 is deenergized and drum 33 stops rotating.

At the same time wiper arm 209 of bridge 98 will tap off that portion of resistance bank 191 equal to the logarithm times 1,000 of the actual remaining moment set by resistance 193, i. e., 7,408 ohms.

The resistance banks 51, 54 and 57 which are connected in series from positive main 59 to point 23 of bridge 163 have a total value of 700 ohms as previously pointed out and form one leg of bridge 163. The annular resistance 173 on panel 34 of bridge 163 which is connected in series with resistance 171a of switch 166 for a fuel consumption of 500 gallons or 3,000 pounds, forms another leg of said bridge.

Bridge 163 will be ordinarily unbalanced and current will flow through the associated servo-amplifier 26 to energize servo-motor 31. Drum 33 of bridge 163 will rotate until wiper arm 181 engages that portion of resistance bank 173 to place in circuit 670 ohms, the difference between 700 ohms, the value of resistance banks 51, 54 and 57 and 30 ohms, the value of resistance 171a. Thus, servo-motor 31 is de-energized and drum 33 stops rotating.

At the same time wiper arm 182 will tap off that portion of resistance bank 175 to place in circuit resistance equal to the logarithm times 1,000 of the weight of 67,000 pounds, i. e., the total weight of 70,000 less 3,000 of fuel consumption weight, or 4,826 ohms, which is the value of resistance bank 175 placed in circuit.

As the resistance bank 191, which is connected to point 24 of bridge 179 to form one leg of said bridge, has a value of 7,408 ohms and as the resistance bank 175 has a value of 4,826 ohms and is in series with resistance bank 178 of bridge 179 to form another leg of said bridge 179, bridge 179 will be ordinarily unbalanced. As a result, current will flow through the associated servo-amplifier 26 to energize servo-motor 31 and drum 33 of bridge 179 will rotate until wiper arm 188 engages that portion of resistance 178 to place in circuit 2,582 ohms, the difference between 7,408 and 4,826 ohms. Thus, servo-motor 31 is de-energized and drum 33 stops rotating.

As above described with respect to resistance bank 88, the 2,582 ohms of resistance bank 178 in circuit is equal to the logarithm times 1,000 of the distance of the center of gravity of the aircraft from the reference datum when 500 gallons of fuel is consumed and the anti-logarithm of resistance 178, i. e. of 2,582 divided by 1,000 is 382, which is the landing center of gravity of the type A aircraft based on a fuel consumption of 500 gallons or 3,000 pounds. Thus, the center of gravity has moved forward one inch.

The operation of the embodiment of Fig. 3, in which the main wheels of the aircraft are selected as the reference datum will now be described in connection with type A aircraft of the same specifications and loading used in the foregoing description.

With the aircraft set upon the scales 245, 246 and 247, the aircraft selector switches 287 and 349 are set to type A position by turning knob 291. This will also set the switch 322 to the type A position shown. As a result, the movable arms 289 and 348 of switches 287 and 349 will engage the fixed contact 288 associated with the resistances 292a and 292'a respectively and the movable arm 321 of switch 322 will engage the fixed contact 323 associated with the type A position.

The weight on scale 245 being 10,000 pounds and the weights on each of the scales 246 and 247 being 30,000 pounds, the movable arms 249 and 251 controlled by the nose scale 245 will tap off that portion of the associated resistance banks 255 and 256 of ohmic value equal to the logarithm of the weight multiplied by 1,000 as illustratively shown in tabulation III. Thus, the value of each resistance bank 255, 256 in circuit will be 4,000 ohms.

Simultaneously, the movable arms 248, 252 and 253 of the weighing scales will tap off that portion of the resistance banks 254, 257 and 258 respectively of ohmic value equal to the actual weight divided by 100 as illustrated in tabulation IV. Thus the value of the resistance banks 254, 257 and 258 in circuit will be 100, 300 and 300 ohms or a total of 700 ohms.

The resistances 292a and 292'a placed in circuit are of ohmic value equal to the logarithm multiplied by 1,000 of the distance between the nose wheel center and the main wheel centers along the longitudinal axis of the aircraft, as illustrated by tabulation VI. Such distance being equal to 330 inches, the value of each resistance 292a and 292'a is 2,519 ohms.

As a result of the initial setting of the equipment to the type A position, the resistance banks 254, 257 and 258 in series (700 ohms) will constitute one leg of the Wheatsone bridge 265. As the resistance 267 on panel 244 forms another leg of bridge 265, the bridge 265 will be ordinarily unbalanced and current will flow through the associated servo-amplifier 236 to energize servo-motor 241. As a result, the associated drum 243 will rotate until wiper arm 282 taps off that portion of resistance 267 equal to 700 ohms when servo-motor 241 is de-energized and drum 243 stops rotating.

At the same time wiper arm 281 taps off that portion of resistance 269 to place resistance in circuit equal to the logarithm times 1,000 of the total weight. The logarithm times 1,000 of this sum equals 4,845 which is the value of resistance 269 placed in circuit.

The resistance bank 255 (4,000 ohms) and resistance 292a (2,519 ohms) of switch 287 which are connected in series from positive main 261 to point 234 of bridge 276 form one leg of said bridge and have a total value of 6,519 ohms and the resistances 269 and 275 which are also connected in series form another leg of bridge 276.

As the value of resistance bank 269 has been set to 4,845 ohms, as above described, bridge 276 will be ordinarily unbalanced. As a result, current will flow through the associated servo-amplifier 236 to energize servo-motor 241 and drum 243 of bridge 276 will rotate until wiper arm 294 engages that portion of resistance bank 275 to place in circuit 1,674 ohms, the difference between 6,519 and 4,845 ohms. At this time servomotor 241 is de-energized and drum 243 stops rotating.

Inasmuch as the sum of resistance banks 255 and 292a is of ohmic value proportional to the logarithm of the moment of the nose wheel with respect to the main wheels and resistance bank 269 is of ohmic value proportional to the logarithm of the total weight, the value of the resistance bank 275 will be equal to the logarithm times 1,000 of the distance of the center of gravity from the centers of the main wheels. The antilogarithm of 1.674 or 47.2 is therefore the distance from the main wheels of the center of gravity of the aircraft type A loaded as above described. That distance may be read on a suitable anti-logarithmic scale on drum 243.

This center of gravity may be related to a percent of the MAC by the formula:

$$CG \text{ in percent } MAC = \frac{H-Y}{C} \times 100$$

$$CG \text{ in percent } MAC = \frac{47.2 - 75}{164} \times 100 = 16.9\%$$

As this take-off center of gravity is within the permissible limits of the MAC of the type A aircraft, i. e. between 380 and 400 inches from the nose or between 30 and 50 inches from the main wheels, or between 15.2% and 27.4% MAC the aircraft will take off safely.

Thus, the single moment system of Fig. 3 gives the same center of gravity and of percent MAC readings as the three moment system of Figs. 1 and 2. It will not be necessary to show the like equivalency with respect to fuel consumption.

The embodiment of Fig. 4 differs from that of Fig. 3 in affording four weighing scales, the aircraft being mounted on those three of the weighing scales which would position it transversely of the wind and thus avoid deviation from correct reading of the actual weight, all as above set forth. With the nose wheel, say on scale 361 and the two main wheels on scales 362 and 464, the aircraft selector switch 431 is set to type A position so that movable arm 429 will engage the fixed contact 432 connected to resistance 433.

The weight of the aircraft on scales 361, 362 and 364 closes the respective micro-switches 437, 438 and 441, completing circuits from positive main 394 to the coils 455, 456 and 458, respectively. As a result, movable arm 465 of relay 459 will engage fixed contact 464; movable arms 468 and 469 of relay 461 will engage fixed contacts 466 and 467 respectively and movable arms 481, 482 and 483 of relay 463 will engage fixed contacts 477, 478 and 479 respectively.

A circuit is thus completed from positive main 394, closed contacts 464, 465, lead 484, closed contacts 466, 468, lead 489, closed contacts 477, 481, lead 494 to one side of coil 497 of relay 419 and from the other side of coil 497 to negative main 396. As only coil 497 of relay 419 will be energized, the contacts 415, 424 thereof will close to complete a circuit from movable arm 376 of weighing scale 361 to movable arm 429 of selector switch 431.

The weight on scale 361 being 10,000 pounds, the movable arm 376 controlled by scale 361 will tap off that portion of the resistance bank 385 which is of ohmic value equal to the logarithm times 1,000 of the weight as illustratively shown in tabulation III. Thus, the value of resistance bank 385 in circuit is 4,000 ohms.

Simultaneously the movable arms 377, 379 and 384 of scales 361, 362 and 364 will tap off those portions of the resistance banks 389, 391 and 393 respectively which are of ohmic value equal to the actual weight (i. e. 10,000, 30,000 and 30,000 pounds respectively) divided by 100 as illustrated in tabulation IV. Thus the value of resistance banks 389, 391 and 393 in circuit will be 100, 300 and 300 ohms. As no weight is on scale 363, the movable arm 382 of the latter will tap off no resistance from resistance bank 392.

The resistance 433 placed in circuit by the setting of aircraft selector switch 431 is of ohmic value equal to the logarithm times 1,000 of the distance of the nose wheel center from that of the main wheels as illustrated by tabulation VI. As such distance is 330 inches, the value of resistance 433 is 2,519 ohms.

The series connected resistance banks 389, 391 and 393 have a value of 700 ohms and form one leg of bridge 399. The bridge 399 will be ordinarily unbalanced and current will flow through the associated servo-amplifier 387 to energize servo-motor 372. As a result, the associated drum 374 will rotate until wiper arm 409 taps off that portion of resistance bank 402 equal to 700 ohms, when the bridge 399 will be in balance and servo-motor 372 will be de-energized so that drum 374 will stop rotating.

At the same time the wiper arm 411 will tap off that portion of resistance bank 404 to place resistance in circuit equal to the logarithm times 1,000 of the total weight as illustrated by tabulation XII. As the total weight is 70,000 pounds, the logarithm times 1,000 of this sum equals 4,845 which is the value of resistance bank 404 placed in circuit.

The resistance bank 385 (4,000 ohms) and resistance 433 (2,519 ohms) are connected in series from positive main 394 to point 364 of bridge 408 as a total resistance of 6,519 ohms. As the value of resistance bank 404 has been set to 4,845 ohms, as above described, bridge 408 will be ordinarily unbalanced. As a result, current will flow through servo-amplifier 387 to energize servo-motor 372 and drum 374 of bridge 408 will rotate until wiper arm 414 engages that portion of resistance 407 to place in circuit 1,674 ohms, the difference between 6,519 and 4,845 ohms. At this time servo-motor 372 is de-energized and drum 374 stops rotating.

Inasmuch as the sum of resistance bank 385 and resistance 433 is of ohmic value proportional to the logarithm of the moment of the nose wheel with respect to the main wheels, and resistance bank 404 is of ohmic value proportional to the logarithm of the total weight, the value of resistance bank 407 will be equal to the logarithm times 1,000 of the distance of the center of gravity from the centers of the main wheels. The anti-logarithm of 1.674 or 47.2 is therefore the distance from the main wheels of the center of gravity of the type A aircraft loaded as above described. That distance may be read on a suitable anti-logarithmic scale on drum 374.

Should the wind be from another direction, the aircraft might illustratively be positioned with the nose wheel on scale 362 and the two main wheels on scales 361 and 363.

As a result, the micro-switches 437, 438 and 439 will be closed to energize coils 455, 456 and 457 of relays 459, 461 and 462. A circuit will be completed from positive main 394, closed contacts 464 and 465 of relay 459, lead 484, closed contacts 466, 468 of relay 461, lead 497, closed contacts 471, 474 of relay 462, lead 439 to coil 491 of relay 421. As a result, the resistance bank 386, which has a value of 4,000 ohms will be connected in series with resistance 433 of selector switch 431 and the equipment will thereupon operate as previously described.

If depending upon the direction of the wind the nose wheel is placed on any of the four scales, the correct center of gravity or percent MAC would be indicated with the substantial elimination of any divergence otherwise incurred due to the force of the wind.

It will be understood that the arrangement shown in Fig. 4 for eliminating divergence in the actual reading of the weighing scales due to the wind, would desirably be incorporated in the system shown in Figs. 1 and 2 as well as in the otherwise complete system shown in Fig. 3, only part of which has been shown in the diagrammatic view of Fig. 4.

Ordinarily the single moment system of Fig. 3 will serve for aircraft generally of familiar design when loaded according to present day practice. However, other types of aircraft under consideration at present or in the future, or systems of loading not at present conventional, may render desirable the more complex three moment system of Figs. 1 and 2 and this may conceivably be extended, on the principle well understood from the foregoing description, to aircraft that may have four or more wheels.

The invention may be carried into practice according to either of two general procedures: (a) to check the center of gravity position of the aircraft immediately prior to take off, and (b) to check the center of gravity position as the aircraft is being loaded.

In the first of these procedures, the aircraft would be loaded according to conventional practice but would be taxied to the weighing scales and positioned thereon at right angles to the direction of the wind, affording an immediate reading preferably indicated in the control tower or, if desired, on the field as well. If the indication shows that the center of gravity is within the safe range of position or within the safe range of per cent MAC, the aircraft would be cleared for takeoff with assurance that there are no fortuitous divergences.

The effect of fuel consumption on the center of gravity position would desirably also be checked at this time to assure that the center of gravity is within safe limits for landing at the destination. To this end the fuel consumption switch would be turned to the estimated fuel consumption for the projected flight and the center of gravity or percent MAC would immediately be read to assure that it remains within the safe limits.

It is of course to be understood that instead of or in addition to providing the circuits herein described for determining the effect of fuel consumption on the position of the center of gravity, an identical circuit or circuits could be used to determine the effect of the dropping of cargo or personnel such as fire fighters or the like from the aircraft while it is in flight.

Should the center of gravity or percent MAC indication be outside of the safe range for either flying or landing, the aircraft would be refused clearance and appropriate adjustments in the loading would be made until the indication registers complete safety both for flight and for landing.

The need for readjustment would of course be minimized if the second procedure were followed and the aircraft were positioned upon the weighing scales throughout the loading operation, so that the center of gravity could be observed on the indicator as the loading proceeds, but particularly toward the completion of the loading at which stage the loading would be controlled in order that the center of gravity is observed to be within safe limits and the need for redistributing the load would be dispensed with.

It is of course to be understood that although the aircraft selector switches permit aircraft of different types to be measured, such switch could be eliminated if the equipment is to measure but one type of aircraft as the distance from the wheels to the reference datum would be predetermined.

While the Wheatstone bridge principle is shown in the drawings and fully described in the specification, it will be understood that this expedient is largely illustrative of means generally for opposing unbalanced impulses and automatically causing such unbalance to bring about desired balance.

While in the specification and the drawings only resistances have been shown as the electrical regulating means, it is of course understood that impedances could be used for the purpose and it is also understood that whether in the Wheatstone bridge type of arrangement or in other arrangements for opposing the initially unbalanced impulses, there could be used systems of electronic oscillators that operate the automatic adjusting motor by differences in frequencies and bring an adjustable oscillator to the frequency of an oscillator that is set by the parameter being measured or by the impulse applied. The frequency of the two oscillators in opposition will be determined by a variable impedance, including inductance and capacitance, in which preferably the capacitance element is adjusted at one side of the balancing unit to attain the controlling frequency of its associated oscillator while the motor controlled by the differences of frequency automatically adjusts the capacitance in the other side of the balancing unit until the frequencies of both sides are equal.

In the broader claims it will be understood that the reference to impulses is meant to include not only currents through resistances, but also currents from electronic oscillators in which latter case the output frequencies will be combined to produce a resultant difference frequency.

The expedient of the opposing currents and more particularly the Wheatstone bridge instrumentalities for translating given resistance into logarithmic values for multiplication or division as the case may be, has particular utility as above set forth in the particular relation described. It will be understood of course that each of the self-balancing Wheatstone bridges could be utilized from the broadest aspect of the invention, in obtaining an ultimate measurement of product or quotient made up of any of a wide variety of parameters other than weight or distance.

Thus, the varible resistance will equal the product of one of the logarithmic resistances by a first power of the second logarithmic resistance, that power being positive when both logarithmic resistances are opposed to the variable resistance and being negative where only the first resistance is so opposed and the second resistance is in series with the variable resistance.

Should it be desired for any purpose to read the value of a moment, a pointer moving about an appropriate scale need merely be driven from a servo-motor that sets variable resistance opposed to series connected resistances of distance and weight, which determine moment. Similarly, weight could re read directly from variable resistance opposed to weight resistance.

As many changes could be made in the above method and apparatus, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. Equipment comprising two variable impedance units calibrated respectively in proportion to the actual and to the logarithmic value of a parameter to be measured, a third impedance unit of calibration corresponding to that of one of the two impedance units, means for setting said third impedance unit to a value corresponding to such parameter, means for connecting a power supply for opposed current flow through said third impedance unit and the corresponding one of said other two impedance units, means in driving relation to said two variable impedance units and actuated by the resultant difference of potential, whereby actuation of said means will effect variation of said two variable impedance units until the impedance units connected for opposed current flow have the same value, and means under control of the other of said two variable impedance units for effecting an indication of which the parameter is a factor.

2. The combination set forth in claim 1 in which each of the impedance units comprises an ohmic resistance.

3. Equipment comprising two variable impedance units calibrated respectively in proportion to the actual and to the logarithmic value of a parameter to be measured, a third impedance unit calibrated in proportion to the actual value of such parameter, means for setting said third impedance unit to a value corresponding to such parameter, means for connecting a power supply for opposed current flow through the two impedance units that are calibrated in proportion to the actual value of such parameter, driving means for said two variable impedance units actuated by the resultant difference of potential, whereby actuation of said driving means will effect variation of said two variable impedance units until the impedance units calibrated in proportion to actual value have the same value, and means under control of the variable impedance unit calibrated in proportion to logarithmic value for effecting an indication of which the parameter is a factor.

4. Equipment comprising two variable impedance units calibrated respectively in proportion to the actual and to the logarithmic value of a parameter to be measured, a third impedance unit calibrated in proportion to the logarithmic value of such parameter, means for setting said third impedance unit to a value corresponding to such parameter, means for connecting a power supply for opposed current flow through the two impedance units that are calibrated in proportion to the logarithmic value of such parameter, driving means for said two variable impedance units actuated by the resultant difference of potential, whereby actuation of said driving means will effect variation of said two variable impedance units until the impedance units calibrated in proportion to logarithmic value have the same value, and means under control of the variable impedance unit calibrated in proportion to actual value for effecting an indication of which the parameter is a factor.

5. Equipment comprising a variable resistance unit calibrated to ohmic values proportional to the actual value of a parameter to be measured, two ganged variable resistance units calibrated respectively to ohmic values proportional to the actual and to the logarithmic value of such parameter, means for connecting a power supply for opposed current flow through said two resistance units that are calibrated in proportion to the actual value of the parameter, an electric motor connected with respect thereto to be driven by the resultant difference of potential and in driving relation to said two ganged variable resistance units, whereby operation of the motor will effect adjustment of the resistance unit of the ganged units calibrated in proportion to the actual value of the parameter until it equals the ohmic value of said variable resistance unit, at which time the difference of potential is eliminated and the motor stops operating, said logarithmically calibrated resistance unit being thus set to a value proportional to the logarithm of such parameter.

6. Equipment for determining the distance of the center of gravity from a given reference datum of an aircraft of the type having two main wheels and a third wheel, comprising means to place in circuit impedance of value proportional to the logarithm of total moment with respect to such given reference datum, variable impedance units associated with the respective wheels, each calibrated in proportion to the actual weight carried, means additively connecting said variable impedance units for a combined impedance proportional to the actual weight of the aircraft, an additional impedance unit calibrated logarithmically, and means controlled by such weight governed additively connected impedances to place into circuit such portion of the additional impedance unit as is of value proportional to the logarithm of the actual total weight of the aircraft, a variable impedance additively connected with respect to said weight impedance, and calibrated logarithmically, and means to pass opposing currents from a common source through said impedance of value proportional to the logarithm of total moment and the additively connected logarithmically calibrated impedances, means controlled by the resultant difference of potential to adjust said variable impedance until the difference of potential is eliminated, at which time the value of the variable impedance is equal to the difference between those of the other logarithmically calibrated impedances, and an indicator correlated with said variable impedance affording an anti-logarithmic reading proportional to said difference of impedances and designating the position of the center of gravity of the aircraft with respect to such given reference datum.

7. The combination set forth in claim 6 in which three weighing scales are provided to support the respective wheels of an aircraft and in which the weight of the aircraft on the scales serves to place in circuit the impedances proportional to the respective weights.

8. The combination set forth in claim 6 in which the following means serves to determine the logarithm of total moment of an aircraft, a variable impedance unit calibrated to values proportional to the logarithm of weight on such third wheel, and an impedance unit additively connected to said third wheel variable impedance unit and calibrated to value proportional to the logarithm of distance from the reference datum of such aircraft to the third wheel.

9. The combination set forth in claim 6 in which the impedance proportional to the logarithm of the total moment is obtained by three weighing scales to support the main wheels and third wheel of an aircraft respectively and in which three pairs of impedances are associated respectively with each of such scales, one of the impedances of each pair being calibrated to values proportional to the logarithm of weight on the associated wheel and the other impedance of each pair being calibrated to a value proportional to the logarithm of the distance of the associated wheel from the reference datum, each of said pairs of impedances being additively connected for a combined impedance value proportional to the logarithm of the product of the weight on the associated wheel and its distance from the reference datum, means to measure off by said respective pairs of impedances, impedances which are respectively proportional to the respective products, means additively connecting said respective product impedances, and means to measure off by said latter additively connected impedances, the desired impedance of value which is proportional to the logarithm of the corresponding sum of the products.

10. The combination in which the final means recited in claim 9 comprises a duplex variable impedance unit one element being calibrated to a value proportional to the actual value of the sum of said additively connected product impedance and the other element being calibrated to values proportional to the logarithm of said sum.

11. The combination set forth in claim 6 in which the center of gravity indication has a minimum, a maximum and a mean value for the smallest type aircraft to be measured and a multiplier impedance is additively connected to said variable impedance and of value proportional to the difference between the logarithms of the mean value of the center of gravity for the smallest and the largest type aircraft to be measured.

12. The combination set forth in claim 6 which includes four weighing scales any three of which may carry respectively the two main wheels and the third wheel of an aircraft, an impedance unit associated with each of said four scales, said impedance units being calibrated respectively to values proportional to the logarithm of the weight on the associated scale, an impedance unit calibrated to values proportional to the logarithm of the distance from the third wheel to the main wheels, switch means controlled by the weight due to the three wheels of the aircraft on the associated three scales additively to connect the impedance unit which is associated with the weight on the third wheel with said distance impedance unit, said additively connected distance impedance unit and weight impedance unit constituting the impedance means of value proportional to the logarithm of the total moment.

13. The combination recited in claim 6 in which there are additional facilities to ascertain the changed position of the center of gravity upon withdrawal of weight from any given position on the loaded aircraft, said additional facilities comprising a manually set device determining the moment with respect to the reference datum of the weight removed, a second manually set device determining the weight removed, impedances under control of said respective devices, means to oppose said impedances respectively to impedances equal to the total moment impedance and the total weight impedance, variable impedances additively connected respectively with the set moment impedance and the set weight impedance, impedances of logarithmic value corresponding to those of the respective variable impedances, means under control of the respective variable impedances for measuring off from said logarithmic impedances impedances proportional respectively to the logarithm of the adjusted moment and to the logarithm of the adjusted weight, a variable impedance additively connected to said measured off logarithmic weight impedance, means opposing current from a common source through said measured off logarithmic moment impedance and said additively connected impedances, means controlled by the resultant difference of potential to adjust said last named variable impedance until the difference of potential is eliminated at which time the value of said variable impedance is equal to the difference between the measured off logarithmic impedances and an indicator correlated with said variable impedance which is calibrated in proportion to the anti-logarithm of said difference of impedances and hence designates the position of the adjusted center of gravity of the aircraft with respect to the reference datum.

14. Equipment for determining the distance from a given reference datum, of the center of gravity of an aircraft having two main wheels and a third wheel which comprises three variable impedance units calibrated linearly and adapted to be set to values proportional to actual weights to be carried by the respective wheels, said units being connected for addition of their impedances, two variable impedance units, the first of the two units being calibrated linearly and adapted to be set to value proportional to such added impedances and the other unit being calibrated to values proportional to the logarithm of such added impedances, means for connecting a power supply for opposed current flow through said additively connected impedance units and the first of said two variable impedance units, means in driving relation to said two variable impedance units and actuated by the resultant difference of potential, whereby actuation of said means will effect variation of said two variable impedance units until the first of said two variable impedance units has the same value as said additively connected impedance units, the other of the two impedance units being thereby set to a value proportional to the logarithm of the total weight of the aircraft, a variable impedance unit logarithmically calibrated and adapted to be set to values proportional to the logarithm of weight carried on such third wheel, an impedance unit logarithmically calibrated and additively connected to said third wheel variable impedance unit and adapted to be set to value proportional to the logarithm of the distance from the reference datum of such aircraft to the third wheel, said two additively connected impedance units having a combined value proportional to the logarithm of the moment of the weight on the third wheel with respect to such reference datum, a variable impedance unit calibrated logarithmically and additively connected to said logarithmic total weight impedance unit, means to pass opposing currents from a common source through said additively connected impedance units related to moment, and said additively connected logarithmic total weight impedance unit and variable impedance unit, means controlled by the resultant difference of potential to adjust said variable impedance unit until the difference of potential is eliminated, at which time it has a value equal to the difference between the moment impedance and total weight impedance, and an indicator correlated with said variable impedance unit which is calibrated in proportion to the anti-logarithm of said difference of impedances and hence designates the position of the center of gravity of the aircraft with respect to such reference datum.

15. The combination set forth in claim 8 in which the distance resistance is adapted to be manually set for the particular type of aircraft to be measured.

References Cited in the file of this patent

UNITED STATES PATENTS

| Number | Name | Date |
|---|---|---|
| 1,573,850 | Naiman | Feb. 23, 1926 |
| 2,108,146 | Simpson | Feb. 15, 1938 |
| 2,373,504 | Schlieben et al. | Apr. 10, 1945 |
| 2,443,045 | Magruder et al. | June 8, 1948 |
| 2,443,093 | Dean | June 8, 1948 |
| 2,520,428 | Nilabanton | Aug. 29, 1950 |
| 2,540,807 | Berry | Feb. 6, 1951 |
| 2,541,429 | Mathes, Jr., et al. | Feb. 13, 1951 |
| 2,559,718 | Goodlett et al. | July 10, 1951 |
| 2,615,330 | Blackman et al. | Oct. 28, 1952 |

FOREIGN PATENTS

| Number | Country | Date |
|---|---|---|
| 625,023 | Great Britain | June 21, 1949 |

OTHER REFERENCES

"Electronic Instruments"; Greenwood et al., Figure 6.7(b); page 139; McGraw-Hill; 1948.

Bridge Type Electrical Computers; W. K. Ergen; "The Review of Scientific Instruments"; volume 18, No. 8; August 1947; pages 564–567.